US012337598B2

(12) United States Patent
Tsubota

(10) Patent No.: US 12,337,598 B2
(45) Date of Patent: Jun. 24, 2025

(54) MAINTENANCE METHOD OF HEAD UNIT

(71) Applicant: SEIKO EPSON CORPORATION, Tokyo (JP)

(72) Inventor: Shinichi Tsubota, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 359 days.

(21) Appl. No.: 18/151,017

(22) Filed: Jan. 6, 2023

(65) Prior Publication Data

US 2023/0219339 A1 Jul. 13, 2023

(30) Foreign Application Priority Data

Jan. 7, 2022 (JP) ................................ 2022-001482

(51) Int. Cl.
*B41J 2/045* (2006.01)

(52) U.S. Cl.
CPC ....... *B41J 2/04588* (2013.01); *B41J 2/04581* (2013.01)

(58) Field of Classification Search
None
See application file for complete search history.

(56) References Cited

U.S. PATENT DOCUMENTS

2011/0285775 A1 11/2011 Shinkawa
2015/0306878 A1 10/2015 Sawase
2015/0360464 A1 12/2015 Katsumura et al.
2018/0370228 A1 * 12/2018 Tamura ..................... B41J 3/30
2020/0047504 A1 2/2020 Tsubota

FOREIGN PATENT DOCUMENTS

EP 3616917 A1 * 3/2020 .......... B41J 2/04541
JP 2009-045803 A 3/2009
JP 2011-110716 A 6/2011
JP 2011-240564 A 12/2011
JP 2014-208424 A 11/2014
JP 2015-208870 A 11/2015
JP 2020-026035 A 2/2020

OTHER PUBLICATIONS

Nitta, Machine TranslationofEP-3616917-A1, 2020 (Year: 2020).*

* cited by examiner

*Primary Examiner* — Scott A Richmond
(74) *Attorney, Agent, or Firm* — WORKMAN NYDEGGER

(57) ABSTRACT

There is provided a maintenance method of a head unit including a first nozzle array and a second nozzle array, the method including: in a first period, supplying a first driving signal having a first waveform to one first driving element corresponding to one first nozzle belonging to the first nozzle array to eject the liquid from one first nozzle; and supplying a second driving signal having a second waveform to one second driving element corresponding to one second nozzle belonging to the second nozzle array to eject the liquid from one second nozzle; and in a second period, supplying a third driving signal having a third waveform to the one first driving element to eject the liquid from the one first nozzle; and supplying a fourth driving signal having a fourth waveform to the one second driving element to eject the liquid from the one second nozzle.

13 Claims, 18 Drawing Sheets

FIG. 7

| | Sd[m] | D[m] | Qa[m] | | | Qb[m] | | |
|---|---|---|---|---|---|---|---|---|
| | | | TQ1 | TQ2 | TQ3 | TQ1 | TQ2 | TQ3 |
| PRINTING DISCHARGE SECTION (DP) | 1 | DP-1 (LARGE DOT) | H | H | H | L | L | L |
| | 2 | DP-2 (MEDIUM DOT) | H | H | L | L | L | L |
| | 3 | DP-3 (SMALL DOT) | L | L | L | H | H | L |
| | 4 | DP-N (NO DOT FORMATION) | L | L | L | L | L | H |
| FLUSHING TARGET DISCHARGE SECTION (DF) | 5 | DF-1 (LARGE AMOUNT EJECTION) | H | H | H | L | L | L |
| | 6 | DF-2 (SMALL AMOUNT EJECTION) | L | H | L | L | L | L |
| | 7 | DF-N (NO EJECTION) | L | L | L | L | L | H |

FIG. 19

| | Sd[m] | DI[m] | Qa[m] TQ1 | Qa[m] TQ2 | Qa[m] TQ3 | Qb[m] TQ1 | Qb[m] TQ2 | Qb[m] TQ3 |
|---|---|---|---|---|---|---|---|---|
| PRINTING DISCHARGE SECTION (DP) | 1 | DP-1 (LARGE DOT) | H | H | H | L | L | L |
| | 2 | DP-2 (MEDIUM DOT) | H | H | L | L | L | L |
| | 3 | DP-3 (SMALL DOT) | L | L | L | H | H | L |
| | 4 | DP-N (NO DOT FORMATION) | L | L | L | L | L | H |
| FLUSHING TARGET DISCHARGE SECTION (DF) | 5 | DF-1 (LARGE AMOUNT EJECTION) | H | H | H | L | L | L |
| | 6 | DF-2 (SMALL AMOUNT EJECTION) | L | L | L | H | H | L |
| | 7 | DF-N (NO EJECTION) | L | L | L | L | L | H |

MAINTENANCE METHOD OF HEAD UNIT

The present application is based on, and claims priority from JP Application Serial Number 2022-001482, filed Jan. 7, 2022, the disclosure of which is hereby incorporated by reference herein in its entirety.

BACKGROUND

1. Technical Field

The present disclosure relates to a maintenance method of a head unit.

2. Related Art

In a liquid discharge apparatus such as an ink jet printer, by driving and displacing a piezoelectric element provided in a head unit of the liquid discharge apparatus with a driving signal, a liquid such as ink filling a pressure chamber provided in the head unit is discharged from nozzles to form an image on a medium such as a recording paper sheet. In such a liquid discharge apparatus, for example, it is necessary to eject the liquid filling the pressure chamber from the nozzles in order to suppress deterioration of the image quality of the image formed by the liquid discharge apparatus due to the thickening or the like of the liquid filling the pressure chamber. Therefore, for example, as described in JP-A-2011-240564, in the related art, there has been proposed a technology related to flushing processing for ejecting the liquid filling the pressure chamber from the nozzles.

However, in the technology of the related art, in the flushing processing, the maximum amount of liquid that can be discharged from each nozzle is discharged from all the nozzles provided in the head unit, and thus the liquid discharged from the nozzles becomes mist and scatters, which may cause deterioration of the image quality of the image formed by the liquid discharge apparatus and occurrence of troubles in the liquid discharge apparatus.

SUMMARY

According to an aspect of the present disclosure, there is provided a maintenance method of a head unit including a first nozzle array having a plurality of first nozzles arranged in parallel along a first axis and discharging a liquid, a second nozzle array having a plurality of second nozzles arranged in parallel along a second axis parallel to the first axis and discharging a liquid, a plurality of first pressure chambers provided corresponding to the plurality of first nozzles and filled with the liquid, a plurality of second pressure chambers provided corresponding to the plurality of second nozzles and filled with the liquid, a plurality of first driving elements provided corresponding to the plurality of first pressure chambers for varying pressures in the corresponding first pressure chambers, a plurality of second driving elements provided corresponding to the plurality of second pressure chambers for varying pressures in the corresponding second pressure chambers, and a supply section that supplies driving signals to the plurality of first driving elements and the plurality of second driving elements, the method including, in a first period, supplying a first driving signal having a first waveform to one first driving element among the plurality of first driving elements to eject the liquid in one first pressure chamber corresponding to the one first driving element among the plurality of first pressure chambers from one first nozzle corresponding to the one first pressure chamber among the plurality of first nozzles; and supplying a second driving signal having a second waveform different from the first waveform to one second driving element among the plurality of second driving elements to eject the liquid in one second pressure chamber corresponding to the one second driving element among the plurality of second pressure chambers from one second nozzle corresponding to the one second pressure chamber among the plurality of second nozzles; and in a second period different from the first period, supplying a third driving signal having a third waveform different from the first waveform to the one first driving element to eject the liquid in the one first pressure chamber from the one first nozzle; and supplying a fourth driving signal having a fourth waveform different from the second waveform and the third waveform to the one second driving element to eject the liquid in the one second pressure chamber from the one second nozzle.

BRIEF DESCRIPTION OF THE DRAWINGS

FIG. 7 is an explanatory diagram for explaining an example of an individual designation signal.

FIG. 19 is an explanatory diagram for explaining an example of an individual designation signal according to Modification Example 4.

DESCRIPTION OF EXEMPLARY EMBODIMENTS

Hereinafter, embodiments for carrying out the present disclosure will be described with reference to the drawings. However, in each drawing, the size and scale of each section are appropriately changed from the actual size and scale. Further, the embodiments described below are preferred specific examples of the present disclosure, and therefore, various technically preferable limitations are given, but the scope of the present disclosure is not restricted to the following description, and is not restricted to the embodiments unless otherwise stated.

A. EMBODIMENT

In the present embodiment, a liquid discharge apparatus will be described using an ink jet printer that forms an image on a recording paper sheet PP by discharging ink as an example. In the present embodiment, the ink is an example of the "liquid", and the recording paper sheet PP is an example of the "medium".

1. Overview of Ink Jet Printer

Figure 1:
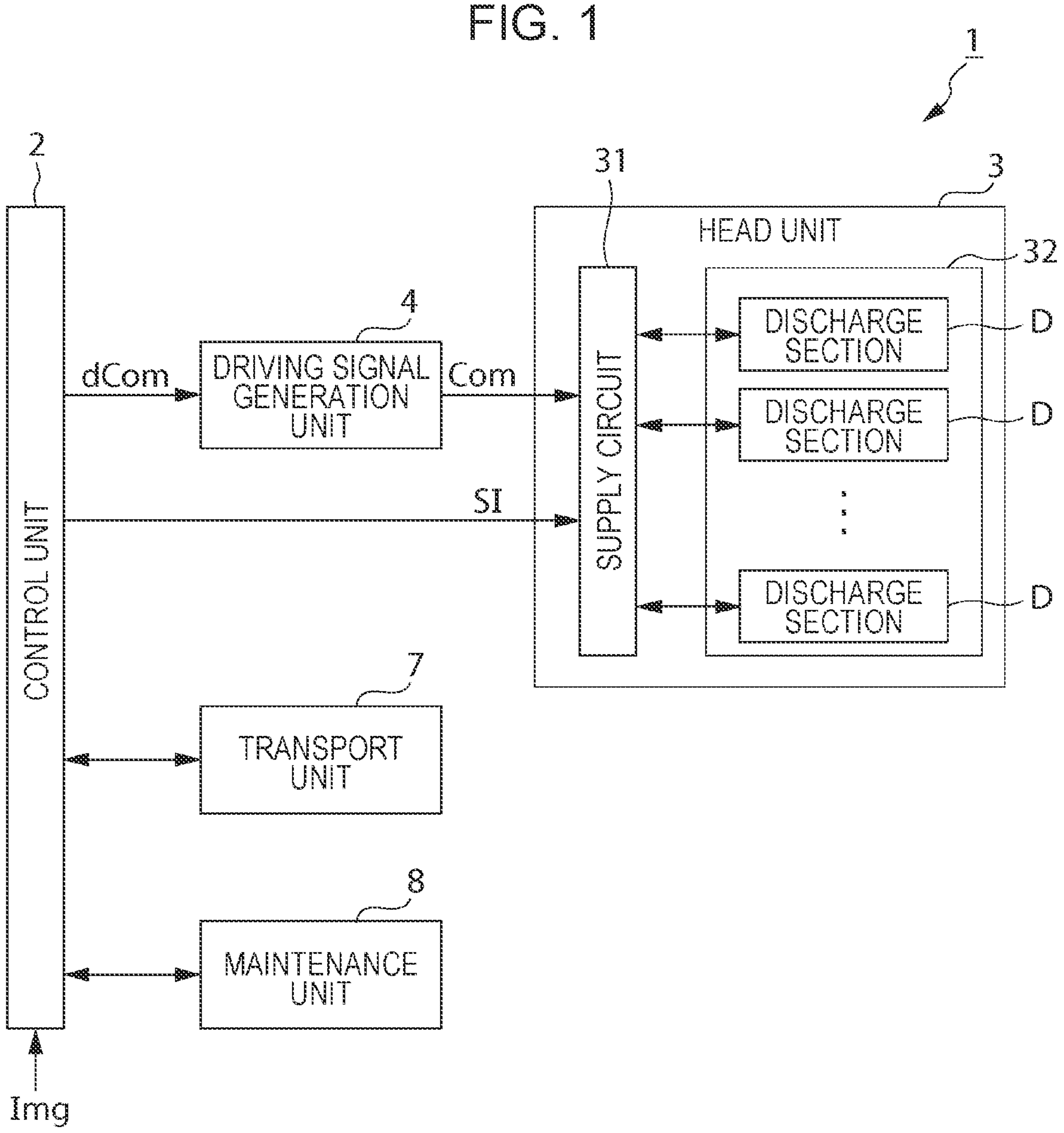
FIG. 1 is a block diagram illustrating an example of a configuration of an ink jet printer according to an embodiment of the present disclosure.

As illustrated in FIG. 1, print data Img indicating an image to be formed by an ink jet printer 1 is supplied to the ink jet printer 1 from a host computer such as a personal computer. The ink jet printer 1 executes printing processing to form an image indicated by the print data Img on the recording paper sheet PP.

The ink jet printer 1 includes a control unit 2 for controlling each section of the ink jet printer 1, a head unit 3 provided with a discharge section D for discharging ink, a driving signal generation unit 4 that generates a driving signal Com for driving the discharge section D, a transport unit 7 for changing the relative position of the recording paper sheet PP with respect to the head unit 3, and a maintenance unit 8 that executes maintenance processing, which will be described later.

Note that in the present embodiment, the ink jet printer 1 includes one or more head units 3 and one or more driving signal generation units 4 corresponding to the one or more head units 3 on a one-to-one basis. Specifically, in the present embodiment, the ink jet printer 1 includes four head units 3 and four driving signal generation units 4 corresponding to the four head units 3 on a one-to-one basis. However, in the following, for convenience of description, as illustrated in FIG. 1, a description will be given by focusing on one head unit 3 among the four head units 3 and one driving signal generation unit 4 provided corresponding to one head unit 3 among the four driving signal generation units 4.

The control unit 2 includes one or more CPUs. However, the control unit 2 may have a programmable logic device such as FPGA instead of or in addition to the CPU. Here, the CPU is an abbreviation for central processing unit, and the FPGA is an abbreviation for field-programmable gate array. The control unit 2 includes one or both of a volatile memory such as a random access memory (RAM), and a non-volatile memory such as a read only memory (ROM), an electrically erasable programmable read-only memory (EEPROM), or a programmable ROM (PROM).

Although the details will be described later, the control unit 2 generates signals for controlling the operation of each section of the ink jet printer 1, such as a print signal SI and a waveform designation signal dCom.

Here, the waveform designation signal dCom is a digital signal that defines the waveform of the driving signal Com. Further, the driving signal Com is an analog signal for driving the discharge section D. In the present embodiment, the driving signal Com includes a driving signal Com-A and a driving signal Com-B. The driving signal generation unit 4 includes a DA converter circuit and generates the driving signal Com having a waveform defined by the waveform designation signal dCom. The print signal SI is a digital signal that designates the type of operation of the discharge section D. Specifically, the print signal SI is a signal that designates the type of operation of the discharge section D by designating whether to supply the driving signal Com to the discharge section D.

As illustrated in FIG. 1, the head unit 3 includes a supply circuit 31 and a recording head 32.

The recording head 32 includes 2M discharge sections D. Here, the value M is a natural number that satisfies "M≥1". Hereinafter, among the 2M discharge sections D provided in the recording head 32, the m-th discharge section D is referred to as a discharge section D[m]. Here, the variable m is a natural number that satisfies "1≤m≤2M". In the following, when a component, a signal, or the like of the ink jet printer 1 corresponds to the discharge section D[m] among the 2M discharge sections D, there is a case where the subscript[m] is added to the reference numeral for representing the component, the signal, or the like.

The supply circuit 31 switches whether to supply the driving signal Com to the discharge section D[m] based on the print signal SI. In the following, among the driving signals Com, the driving signal Com supplied to the discharge section D[m] is referred to as a supply driving signal Vin[m].

As described above, in the present embodiment, the ink jet printer 1 executes printing processing. When the printing processing is executed, the control unit 2 generates signals for controlling the head unit 3, such as the print signal SI, signals for controlling the driving signal generation unit 4, such as the waveform designation signal dCom, and signals for controlling the transport unit 7, based on the print data Img. As a result, the control unit 2 controls the transport unit 7 to change the relative position of the recording paper sheet PP with respect to the head unit 3 in the printing processing, adjusts the presence and absence of ink discharge from the discharge section D[m], the discharge amount of ink, the discharge timing of ink, and the like, and controls each section of the ink jet printer 1 to form an image corresponding to the print data Img on the recording paper sheet PP.

As described above, in the present embodiment, the ink jet printer 1 executes maintenance processing for maintaining the discharge section D. Here, in the present embodiment, the maintenance processing includes flushing processing of ejecting ink from the discharge section D, wiping processing of wiping off foreign matter such as ink adhering to the vicinity of the nozzle N of the discharge section D with a wiper, and pumping processing of suctioning the ink in the discharge section D with a tube pump or the like. The maintenance unit 8 includes an ejection ink receiving section 80 for receiving the ejected ink when the ink in the discharge section D is ejected, a wiper for wiping off foreign matter such as ink adhering to the vicinity of the nozzle N of the discharge section D, and a tube pump for suctioning the ink, air bubbles, and the like in the discharge section D. The wiper and tube pump are not illustrated.

The control unit 2 generates a signal for controlling the head unit 3 such as the print signal SI and a signal for controlling the driving signal generation unit 4 such as the waveform designation signal dCom when the flushing processing is executed. When the ink jet printer 1 executes the flushing processing, the print signal SI designates the operations of the 2M discharge sections D such that the 2M discharge sections D provided in the head unit 3 are operated in a predetermined manner.

Further, the control unit 2 generates a signal for controlling the transport unit 7 such that the head unit 3 moves to a position facing the ejection ink receiving section 80 when the flushing processing is executed. Thereby, the control unit 2 controls each section of the ink jet printer 1 such that the ink is ejected from the discharge section D provided in the head unit 3 to the ejection ink receiving section 80 in the flushing processing.

Figure 2:
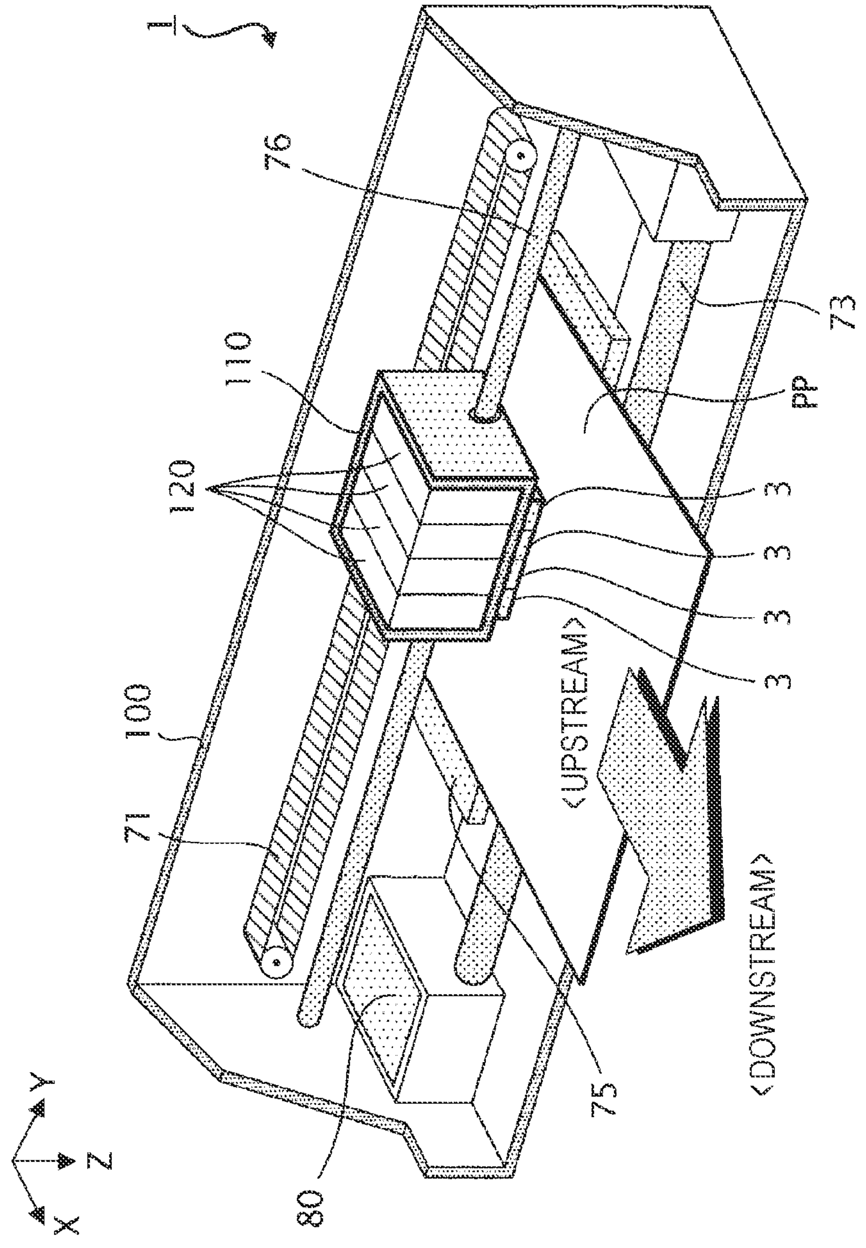
FIG. 2 is a perspective view illustrating an example of a schematic internal structure of the ink jet printer.

As illustrated in FIG. 2, in the present embodiment, the ink jet printer 1 is a serial printer. Specifically, when executing the printing processing, the ink jet printer 1 transports the recording paper sheet PP in the sub-scanning direction, reciprocates the head unit 3 in the main scanning direction intersecting the sub-scanning direction, and discharges ink from the discharge section D[m] to form dots Dt corresponding to the print data Img on the recording paper sheet PP.

In the following, the +X direction and the −X direction that is the opposite direction thereof are collectively referred to as the “X-axis direction”, the +Y direction intersecting the X-axis direction and the −Y direction that is the opposite direction thereof are collectively referred to as the “Y-axis direction”, and the +Z direction intersecting the X-axis direction and the Y-axis direction and the −Z direction that is the opposite direction thereof are collectively referred to as the “Z-axis direction”. In the present embodiment, as illustrated in FIG. 2, the +X direction from the upstream −X side to the downstream +X side is defined as the sub-scanning direction, and the +Y direction and the −Y direction are defined as the main scanning direction. Further, in the present embodiment, as illustrated in FIG. 2, the +Z direction is set as the ink discharge direction from the discharge section D[m].

As illustrated in FIG. 2, the ink jet printer 1 according to the present embodiment includes a housing 100 and a carriage 110 capable of reciprocating in the Y-axis direction in the housing 100 and having four head units 3 mounted thereon.

In the present embodiment, as illustrated in FIG. 2, the carriage 110 stores four ink cartridges 120 corresponding to the four color inks of cyan, magenta, yellow, and black on a one-to-one basis. Further, in the present embodiment, as described above, the ink jet printer 1 includes four head units 3 corresponding to the four ink cartridges 120 on a one-to-one basis. As a result, each discharge section D[m] can be filled with ink supplied from the corresponding ink cartridge 120, and can discharge the ink from the nozzle N. Note that the ink cartridge 120 may be provided outside the carriage 110.

Further, as described above, the ink jet printer 1 according to the present embodiment includes the transport unit 7. As illustrated in FIG. 2, the transport unit 7 includes a carriage transport mechanism 71 for reciprocating the carriage 110 in the Y-axis direction, a carriage guide shaft 76 for supporting the carriage 110 to reciprocate in the Y-axis direction, a medium transport mechanism 73 for transporting the recording paper sheet PP, and a platen 75 provided on the +Z side of the carriage 110.

Figure 3:
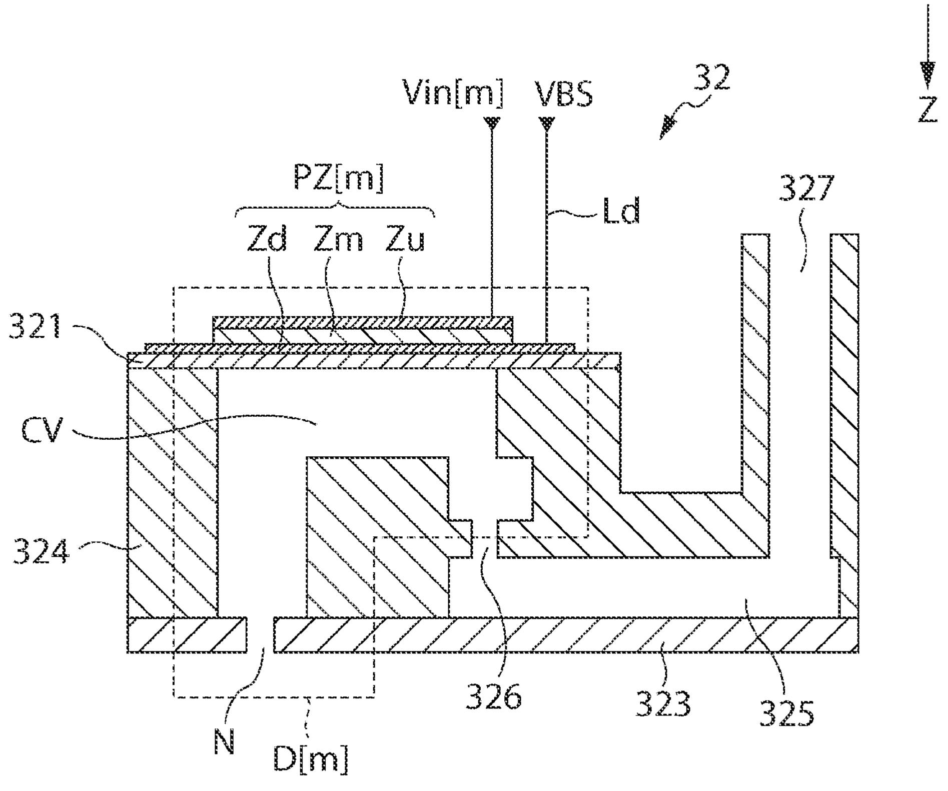
FIG. 3 is a sectional view for explaining an example of a structure of a discharge section.

As illustrated in FIG. 3, the discharge section D[m] includes a piezoelectric element PZ[m], a cavity CV filled with ink, a nozzle N that communicates with the cavity CV, and a vibrating plate 321. The discharge section D[m] discharges the ink in the cavity CV from the nozzle N by driving the piezoelectric element PZ[m] by the supply driving signal Vin[m]. The cavity CV is a space defined by a cavity plate 324, a nozzle plate 323 in which the nozzles N are formed, and the vibrating plate 321. The cavity CV communicates with a reservoir 325 via an ink supply port 326. The reservoir 325 communicates with the ink cartridge 120 corresponding to the discharge section D[m] via an ink intake port 327. The piezoelectric element PZ[m] includes an upper electrode Zu[m], a lower electrode Zd[m], and a piezoelectric body Zm[m] provided between the upper electrode Zu[m] and the lower electrode Zd[m]. The lower electrode Zd[m] is electrically coupled to a power supply line Ld set to a potential VBS. When the supply driving signal Vin[m] is supplied to the upper electrode Zu[m] and a voltage is applied between the upper electrode Zu[m] and the lower electrode Zd[m], the piezoelectric element PZ[m] is displaced in the +Z direction or the −Z direction in accordance with the applied voltage, and as a result, the piezoelectric element PZ[m] vibrates. The lower electrode Zd[m] is joined to the vibrating plate 321. Therefore, when the piezoelectric element PZ[m] is driven by the supply driving signal Vin[m] and vibrates, the vibrating plate 321 also vibrates. The vibration of the vibrating plate 321 changes the volume of the cavity CV and the pressure in the cavity CV, and the ink that fills the cavity CV is discharged from the nozzle N.

Figure 4:
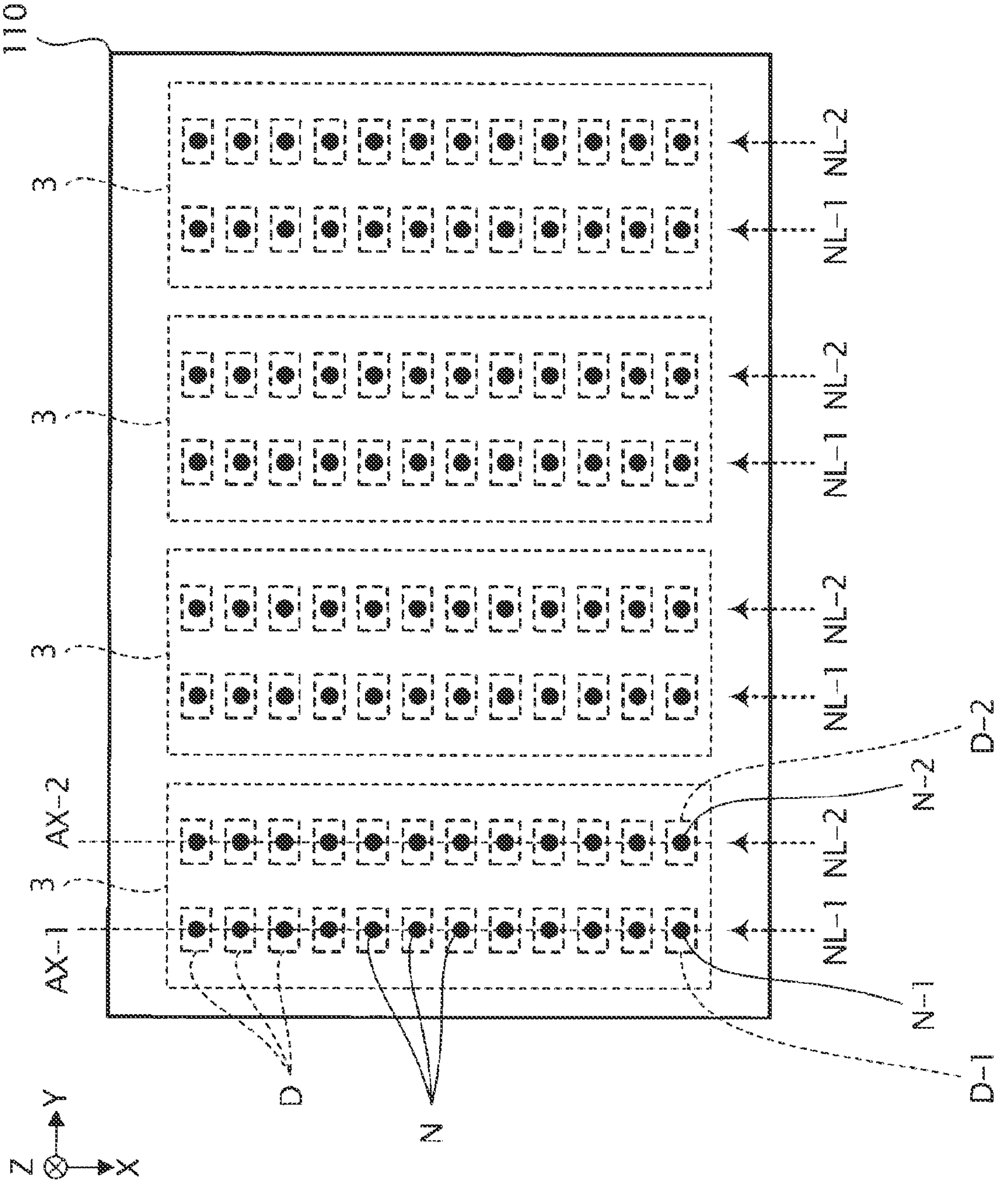
FIG. 4 is a plan view illustrating an example of arrangement of nozzles in a head unit.

FIG. 4 is an explanatory diagram for explaining an example of the arrangement of four head units 3 mounted on the carriage 110 and a total of 8M nozzles N provided in the four head units 3 when the ink jet printer 1 is viewed in plan view in the +Z direction.

As illustrated in FIG. 4, each head unit 3 mounted on the carriage 110 is provided with two nozzle arrays NL. Here, the nozzle array NL is a plurality of nozzles N provided to extend in a row in a predetermined direction. In the present embodiment, each nozzle array NL is composed of M nozzles N arranged to extend in the X-axis direction.

Further, hereinafter, one nozzle array NL of the two nozzle arrays NL provided in the head unit 3 is referred to as a nozzle array NL-1, and the other nozzle array NL is referred to as a nozzle array NL-2. More specifically, in the present embodiment, the nozzle array NL-1 is composed of M nozzles N provided along an axis AX-1 parallel to the X-axis direction, and the nozzle array NL-2 is composed of M nozzles N provided along an axis AX-2 parallel to the X-axis direction and positioned in the +Y direction of the axis AX-1. That is, in the present embodiment, the head unit 3 has a total of 2M nozzles N, M nozzles N belonging to the nozzle array NL-1 and M nozzles N belonging to the nozzle array NL-2. The nozzle array NL-1 is an example of a “first nozzle array”, the nozzle array NL-2 is an example of a “second nozzle array”, the axis AX-1 is an example of a “first axis”, and the axis AX-2 is an example of a “second axis”.

Further, hereinafter, among the 2M nozzles N provided in the head unit 3, the nozzles N belonging to the nozzle array NL-1 are referred to as nozzles N-1, and the nozzles N belonging to the nozzle array NL-2 are referred to as nozzles N-2. Further, hereinafter, among the M nozzles N-1 belonging to the nozzle array NL-1, the m1-th nozzle N-1 is referred to as a nozzle N-1[m1], and among the M nozzles N-2 belonging to the nozzle array NL-2, the m2-th nozzle N-2 is referred to as a nozzle N-2[m2]. Here, the variable m1 is a natural number that satisfies “$1 \le m1 \le M$”, and the variable m2 is a natural number that satisfies “$1 \le m2 \le M$”. The nozzle N-1 is an example of a “first nozzle”, and the nozzle N-2 is an example of a “second nozzle”.

Further, hereinafter, among the 2M discharge sections D provided in the head unit 3, the discharge section D including the nozzle N-1 belonging to the nozzle array NL-1 is referred to as a discharge section D-1, and the discharge section D including the nozzle N-2 belonging to the nozzle array NL-2 is referred to as a discharge section D-2. That is, the 2M discharge sections D[1] to D[2M] provided in the head unit 3 include the M discharge sections D-1[1] to D-1[M] corresponding to the nozzle array NL-1, and the M discharge sections D-2[1] to D-2[M] corresponding to the nozzle array NL-2. Further, hereinafter, the discharge section D-1 including the nozzle N-1 [m1] is referred to as a discharge section D-1[m1], and the discharge section D-2 including the nozzle N-2[m2] is referred to as a discharge section D-2[m2].

Further, hereinafter, the piezoelectric element PZ provided in the discharge section D-1 [m1] is referred to as a piezoelectric element PZ-1[m1], and the piezoelectric element PZ provided in the discharge section D-2[m2] is referred to as a piezoelectric element PZ-2[m2]. Further, hereinafter, the supply driving signal Vin supplied to the discharge section D-1 [m1] is referred to as a supply driving signal Vin-1[m1], and the supply driving signal Vin supplied to the discharge section D-2[m2] is referred to as a supply driving signal Vin-2[m2]. Further, hereinafter, the cavity CV provided in the discharge section D-1 [m1] is referred to as a cavity CV-1[m1], and the cavity CV provided in the discharge section D-2[m2] is referred to as a cavity CV-2 [m2].

The piezoelectric element PZ-1 is an example of a "first driving element", and the piezoelectric element PZ-2 is an example of a "second driving element". Further, the cavity CV-1 is an example of a "first pressure chamber", and the cavity CV-2 is an example of a "second pressure chamber".

2. Overview of Head Unit

Figure 5:
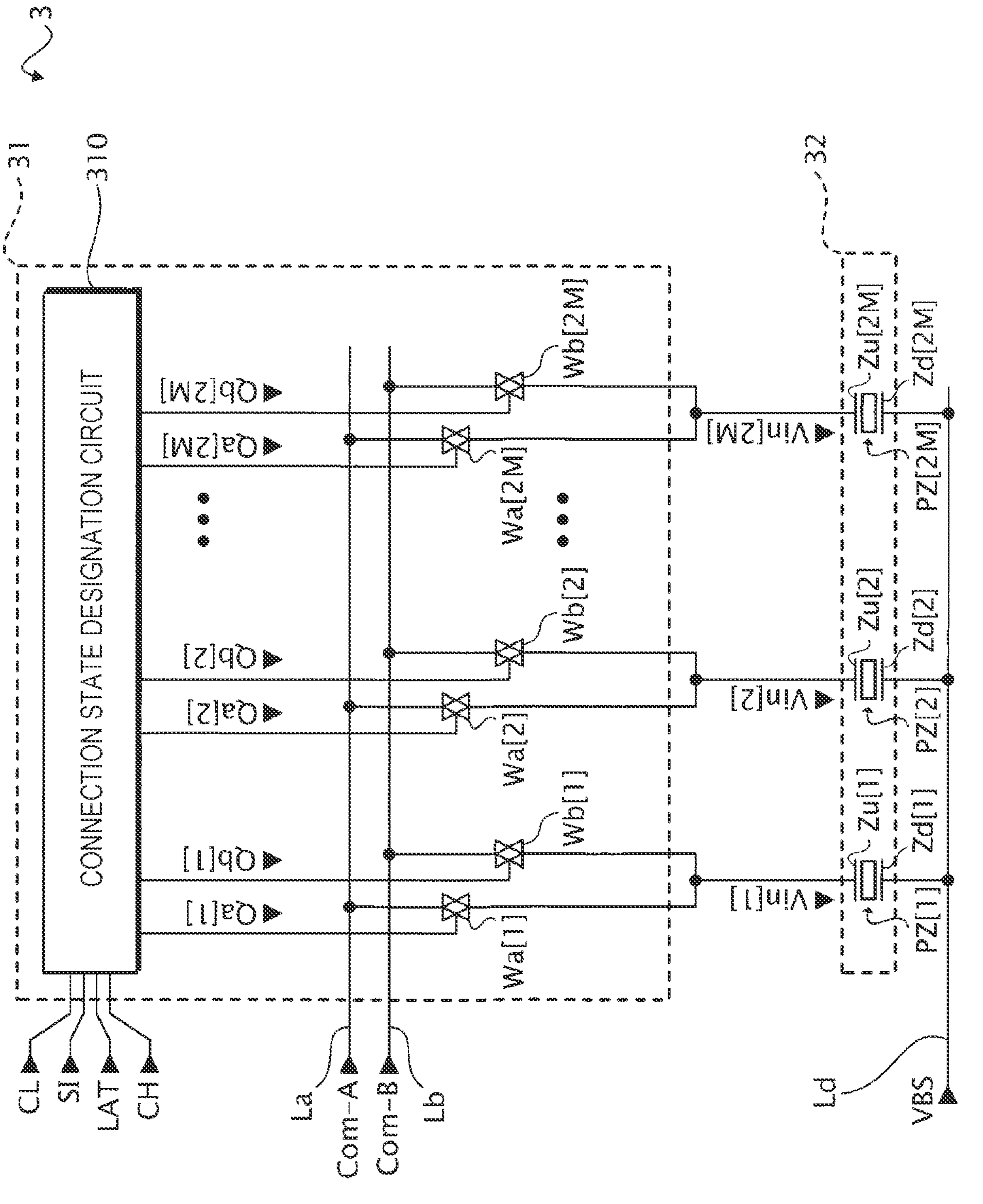
FIG. 5 is a block diagram illustrating an example of a configuration of the head unit.

As illustrated in FIG. 5, the head unit 3 includes the supply circuit 31 and the recording head 32. The head unit 3 also includes a wiring La to which the driving signal Com-A is supplied from the driving signal generation unit 4 and a wiring Lb to which the driving signal Com-B is supplied from the driving signal generation unit 4.

As illustrated in FIG. 5, the supply circuit 31 includes 2M switches Wa[1] to Wa[2M] corresponding to the 2M discharge sections D[1] to D[2M] on a one-to-one basis, 2M switches Wb[1] to Wb[2M] corresponding to the 2M discharge sections D[1] to D[2M] on a one-to-one basis, and a coupled state designation circuit 310 for designating the coupled state of each switch. The supply circuit 31 is an example of a "supply section".

The coupled state designation circuit 310 generates a coupled state designation signal Qa[m] for designating the on/off state of the switch Wa[m] and a coupled state designation signal Qb[m] for designating the on/off state of the switch Wb[m] based on at least a part of the print signal SI, a latch signal LAT, and a change signal CH supplied from the control unit 2.

The switch Wa[m] switches conduction and non-conduction between the wiring La and the upper electrode Zu[m] of the piezoelectric element PZ[m] provided in the discharge section D[m] based on the coupled state designation signal Qa[m]. In the present embodiment, the switch Wa[m] is turned on when the coupled state designation signal Qa[m] is at a high level, and is turned off when the coupled state designation signal Qa[m] is at a low level. When the switch Wa[m] is turned on, the driving signal Com-A supplied to the wiring La is supplied to the upper electrode Zu[m] of the discharge section D[m] as the supply driving signal Vin[m].

The switch Wb[m] switches conduction and non-conduction between the wiring Lb and the upper electrode Zu[m] of the piezoelectric element PZ[m] provided in the discharge section D[m] based on the coupled state designation signal Qb[m]. In the present embodiment, the switch Wb[m] is turned on when the coupled state designation signal Qb[m] is at a high level, and is turned off when the coupled state designation signal Qb[m] is at a low level. When the switch Wb[m] is turned on, the driving signal Com-B supplied to the wiring Lb is supplied as the supply driving signal Vin[m] to the upper electrode Zu[m] of the discharge section D[m].

In the present embodiment, when the ink jet printer 1 executes the printing processing or the flushing processing, one or more unit periods TP are set as operation periods of the ink jet printer 1. The ink jet printer 1 according to the present embodiment can drive each discharge section D[m] for the printing processing or the flushing processing in each unit period TP. In the following description, the unit period TP during which the printing processing is executed is referred to as a printing unit period TPP, and the unit period TP during which the flushing processing is executed is referred to as a flushing unit period TPF.

Figure 6:
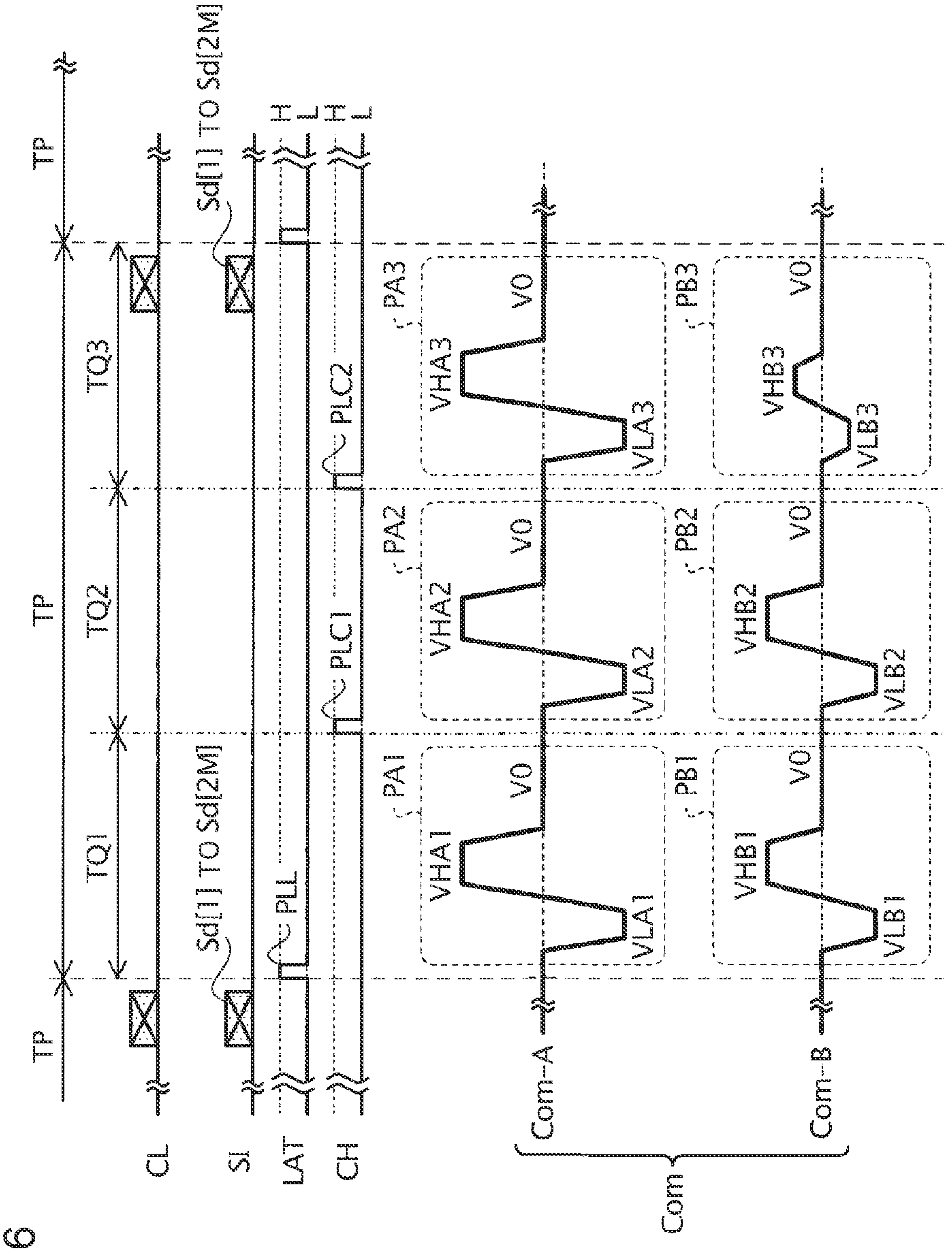
FIG. 6 is a timing chart for explaining an example of a signal supplied to the head unit.

FIG. 6 is a timing chart illustrating various signals such as the driving signal Com supplied to the head unit 3 during the unit period TP.

As illustrated in FIG. 6, the control unit 2 outputs the latch signal LAT having a pulse PLL.

Accordingly, the control unit 2 defines the unit period TP as a period from the rise of the pulse PLL to the rise of the next pulse PLL.

The control unit 2 outputs the change signal CH having a pulse PLC1 and a pulse PLC2 during the unit period TP. The control unit 2 divides the unit period TP into a control period TQ1 from the rise of the pulse PLL to the rise of the pulse PLC1, a control period TQ2 from the rise of the pulse PLC1 to the rise of the pulse PLC2, and a control period TQ3 from the rise of the pulse PLC2 to the rise of the pulse PLL.

In the present embodiment, the print signal SI includes 2M individual designation signals Sd[1] to Sd[2M] corresponding to the 2M discharge sections D[1] to D[2M] on a one-to-one basis. The individual designation signal Sd[m] designates an aspect of driving of the discharge section D[m] in each unit period TP when the ink jet printer 1 executes the printing processing or the flushing processing.

As illustrated in FIG. 6, the control unit 2 synchronizes the print signal SI including the 2M individual designation signals Sd[1] to Sd[2M] with a clock signal CL before each unit period TP, and then supplies the signal to the coupled state designation circuit 310. Then, the coupled state designation circuit 310 generates the coupled state designation signal Qa[m] and the coupled state designation signal Qb[m] based on the individual designation signal Sd[m] in the unit period TP.

In the present embodiment, during the printing unit period TPP, which is the unit period TP during which the printing processing is executed, the discharge section D[m] can form any dot Dt among a large dot made of ink having an ink amount ξ1, a medium dot made of an ink having an ink amount ξ2 smaller than the ink amount ξ1, and a small dot made of an ink having an ink amount ξ3 smaller than the ink amount ξ2. In addition, hereinafter, when the unit period TP is the printing unit period TPP, the discharge section D may be referred to as a print discharge section DP.

Further, in the present embodiment, during the flushing unit period TPF, which is the unit period TP during which the flushing processing is executed, the discharge section D[m] can execute large amount ink ejection for ejecting the ink having an ink amount ξ4, and small amount ink ejection for ejecting the ink having the ink amount ξ5 smaller than the ink amount ξ4. In addition, hereinafter, when the unit period TP is the flushing unit period TPF, the discharge section D may be referred to as a flushing target discharge section DF.

As illustrated in FIG. 7, in the present embodiment, the individual designation signal Sd[m] can take any one value among four values, a value of "1" for designating the discharge section D[m] as a large dot forming discharge section DP-1, a value of "2" for designating the discharge section D[m] as a medium dot forming discharge section DP-2, a value of "3" for designating the discharge section D[m] as a small dot forming discharge section DP-3, and a value of "4" for designating the discharge section D[m] as a dot non-forming discharge section DP-N, in the printing unit period TPP which is the unit period TP, during which the printing processing is executed.

As illustrated in FIG. 7, in the present embodiment, in the flushing unit period TPF which is the unit period TP during which the flushing processing is executed, the individual designation signal Sd[m] can take any one value among three values, a value of "5" for designating the discharge section D[m] as a large amount ink discharge section DF-1, a value of "6" for designating the discharge section D[m] as a small amount ink discharge section DF-2, and a value of "7" for designating the discharge section D[m] as an ejection restriction discharge section DF-N.

As illustrated in FIG. 6, in the present embodiment, the driving signal Com-A has a waveform PA1 provided in the control period TQ1, a waveform PA2 provided in the control period TQ2, and a waveform PA3 provided in the control period TQ3.

Among these, the waveform PA1 is a waveform that returns from a reference potential V0 to the reference potential V0 via a potential VLA1 lower than the reference potential V0 and a potential VHA1 higher than the reference potential V0. When the supply driving signal Vin[m] having the waveform PA1 is supplied to the discharge section D[m], the waveform PA1 is determined such that the ink corresponding to an ink amount φ1 is discharged from the discharge section D[m].

In addition, the waveform PA2 is a waveform that returns from the reference potential V0 to the reference potential V0 via a potential VLA2 lower than the reference potential V0 and a potential VHA2 higher than the reference potential V0. When the supply driving signal Vin[m] having the waveform PA2 is supplied to the discharge section D[m], the waveform PA2 is determined such that the ink corresponding to an ink amount φ2 is discharged from the discharge section D[m].

In addition, the waveform PA3 is a waveform that returns from the reference potential V0 to the reference potential V0 via a potential VLA3 lower than the reference potential V0 and a potential VHA3 higher than the reference potential V0. When the supply driving signal Vin[m] having the waveform PA3 is supplied to the discharge section D[m], the waveform PA3 is determined such that the ink corresponding to an ink amount φ3 is discharged from the discharge section D[m].

Note that the waveform PA1, the waveform PA2, and the waveform PA3 are hereinafter collectively referred to as a waveform PAA.

In the present embodiment, as an example, when the potential of the supply driving signal Vin[m] supplied to the discharge section D[m] is high, the volume of the cavity CV in the discharge section D[m] is smaller than when the potential of the supply driving signal Vin[m] is low. Therefore, when the discharge section D[m] is driven by the supply driving signal Vin[m] having the waveform PA1 or the like, the potential of the supply driving signal Vin[m] changes from a low potential to a high potential, and accordingly, the ink in the discharge section D[m] is discharged from the nozzle N.

Further, in the present embodiment, the waveform PA1, the waveform PA2, and the waveform PA3 have substantially the same shape. That is, in the present embodiment, the ink amount φ1, the ink amount φ2, and the ink amount φ3 are substantially the same amount. Hereinafter, the ink amount φ1, the ink amount φ2, and the ink amount φ3 are collectively referred to as an ink amount φL.

Here, "substantially the same" means not only the case of being completely the same, but also the case of being considered to be the same considering the error, for example, the case of being the same in design but different from each other due to manufacturing error and the case of being the same in the specifications but different from each other due to errors caused by disturbances and the like. In the present specification, "substantially the same" is simply referred to as "the same". That is, in the present specification, "the same" is a concept including "substantially the same".

As illustrated in FIG. 6, in the present embodiment, the driving signal Com-B has a waveform PB1 provided in the control period TQ1, a waveform PB2 provided in the control period TQ2, and a waveform PB3 provided in the control period TQ3.

Among these, the waveform PB1 is a waveform that returns from the reference potential V0 to the reference potential V0 via a potential VLB1 lower than the reference potential V0 and higher than the potential VLA1, and a potential VHB1 higher than the reference potential V0 and lower than the potential VHA1. When the supply driving signal Vin[m] having the waveform PB1 is supplied to the discharge section D[m], the waveform PB1 is determined such that the ink corresponding to an ink amount φ4 is discharged from the discharge section D[m]. In the present embodiment, the ink amount φ4 is smaller than the ink amount φ1.

In addition, the waveform PB2 is a waveform that returns from the reference potential V0 to the reference potential V0 via a potential VLB2 lower than the reference potential V0 and higher than the potential VLA2, and a potential VHB2 higher than the reference potential V0 and lower than the potential VHA2. When the supply driving signal Vin[m] having the waveform PB2 is supplied to the discharge section D[m], the waveform PB2 is determined such that the ink corresponding to an ink amount φ5 is discharged from the discharge section D[m]. In the present embodiment, the ink amount φ5 is smaller than the ink amount φ2.

Further, the waveform PB3 is a waveform that returns from the reference potential V0 to the reference potential V0 via a potential VLB3 lower than the reference potential V0 and higher than the potential VLA3, and a potential VHB3 higher than the reference potential V0 and lower than the potential VHA3. When the supply driving signal Vin[m] having the waveform PB3 is supplied to the discharge section D[m], the waveform PB3 is determined such that the ink is not discharged from the discharge section D[m].

Note that the waveform PB1 and the waveform PB2 are hereinafter collectively referred to as a waveform PBB. Further, in the present embodiment, the waveform PB1 and the waveform PB2 have substantially the same shape.

In the present embodiment, the ink amount ξ1 corresponds to the total amount of the ink amount φ1, the ink amount $\varphi 2$, and the ink amount $\varphi 3$, the ink amount 2 corresponds to the total amount of the ink amount $\varphi 1$ and the ink amount $\varphi 2$, the ink amount $\xi 3$ corresponds to the total amount of the ink amount $\varphi 4$ and the ink amount $\varphi 5$, the ink amount $\xi 4$ corresponds to the total amount of the ink amount $\varphi 1$, the ink amount $\varphi 2$, and the ink amount $\varphi 3$, and the ink amount $\xi 5$ corresponds to the ink amount $\varphi 2$.

As illustrated in FIG. 7, when the individual designation signal Sd[m] indicates the value "1", the coupled state designation circuit 310 sets the coupled state designation signal Qa[m] to a high level in the control period TQ1, the control period TQ2, and the control period TQ3. In this case, the switch Wa[m] is turned on for the printing unit period TPP, and the discharge section D[m] is driven by the supply driving signal Vin[m] having the waveform PA1, the waveform PA2, and the waveform PA3, and discharges the ink having the ink amount $\xi 1$ corresponding to a large dot.

In addition, when the individual designation signal Sd[m] indicates the value "2", the coupled state designation circuit 310 sets the coupled state designation signal Qa[m] to a high level in the control period TQ1 and the control period TQ2. In this case, the switch Wa[m] is turned on in the control period TQ1 and the control period TQ2. Therefore, the discharge section D[m] is driven by the supply driving signal Vin[m] having the waveform PA1 and the waveform PA2 in the printing unit period TPP, and discharges the ink having an ink amount $\xi 2$ corresponding to a medium dot.

Further, when the individual designation signal Sd[m] indicates the value "3", the coupled state designation circuit 310 sets the coupled state designation signal Qb[m] to a high level in the control period TQ1 and the control period TQ2. In this case, the switch Wb[m] is turned on in the control period TQ1 and the control period TQ2. Therefore, the discharge section D[m] is driven by the supply driving signal Vin[m] having the waveform PB1 and the waveform PB2 in the printing unit period TPP, and discharges the ink having the ink amount $\xi 3$ corresponding to a small dot.

Further, when the individual designation signal Sd[m] indicates the value "4", the coupled state designation circuit 310 sets the coupled state designation signal Qb[m] to a high level in the control period TQ3. In this case, the switch Wb[m] is turned on in the control period TQ3. Therefore, the discharge section D[m] is driven by the supply driving signal Vin[m] having the waveform PB3 in the printing unit period TPP, but does not discharge ink.

Further, when the individual designation signal Sd[m] indicates the value "5", the coupled state designation circuit 310 sets the coupled state designation signal Qa[m] to a high level in the control period TQ1, the control period TQ2, and the control period TQ3. In this case, the switch Wa[m] is turned on for the flushing unit period TPF. Therefore, the discharge section D[m] is driven by the supply driving signal Vin[m] having the waveform PA1, the waveform PA2, and the waveform PA3 in the flushing unit period TPF, and discharges the ink having the ink amount 4 corresponding to the large amount ink ejection.

Further, when the individual designation signal Sd[m] indicates the value "6", the coupled state designation circuit 310 sets the coupled state designation signal Qa[m] to a high level in the control period TQ2. In this case, the switch Wa[m] is turned on in the control period TQ2. Therefore, the discharge section D[m] is driven by the supply driving signal Vin[m] having the waveform PA2 in the flushing unit period TPF, and discharges the ink having the ink amount $\xi 5$ corresponding to a small amount ink ejection.

Further, when the individual designation signal Sd[m] indicates the value "7", the coupled state designation circuit 310 sets the coupled state designation signal Qb[m] to a high level in the control period TQ3. Therefore, the discharge section D[m] is driven by the supply driving signal Vin[m] having the waveform PB3 in the flushing unit period TPF, but does not discharge ink.

In the following, in the flushing unit period TPF, the waveform of the supply driving signal Vin[m] supplied to the discharge section D[m] designated as the large amount ink discharge section DF-1 is referred to as a large amount ink ejection waveform PF1, the waveform of the supply driving signal Vin[m] supplied to the discharge section D[m] designated as the small amount ink discharge section DF-2 is referred to as a small amount ink ejection waveform PF2, and the waveform of the supply driving signal Vin[m] supplied to the discharge section D[m] designated as the ejection restriction discharge section DF-N is referred to as an ink ejection restriction waveform PFN. That is, in the present embodiment, the large amount ink ejection waveform PF1 is a waveform consisting of the waveform PA1, the waveform PA2, and the waveform PA3, the small amount ink ejection waveform PF2 is the waveform PA2, and the ink ejection restriction waveform PFN is a waveform PB3.

3. Flushing Processing

Figure 8:
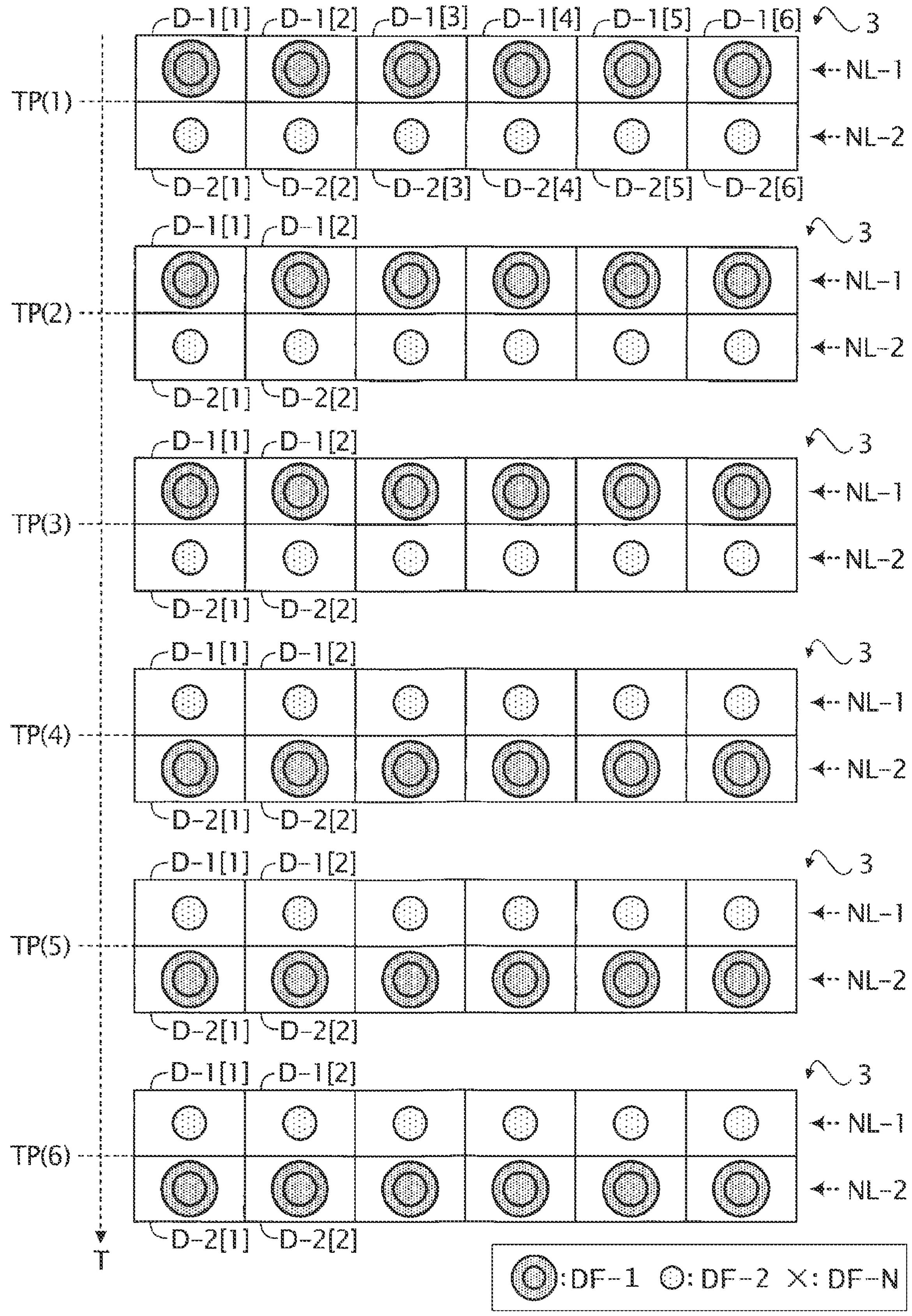
FIG. 8 is an explanatory diagram for explaining an example of flushing processing according to the embodiment.

In the example illustrated in FIG. 8, a case of "M=6" in which each nozzle array NL provided in the head unit 3 is composed of six discharge sections D is illustrated. The nozzle array NL-1 includes the nozzles N-1[1] to N-1[6] corresponding to the discharge sections D-1[1] to D-1[6], and the nozzle array NL-2 includes the nozzles N-2[1] to N-2[6] corresponding to the discharge sections D-2[1] to D-2[6].

Further, in the example illustrated in FIG. 8, the flushing processing is executed in unit periods TP(1) to TP(6), which are six continuous unit periods TP.

As illustrated in FIG. 8, in each of the unit periods TP(1) to TP(3) among the unit periods TP(1) to TP(6) during which the flushing processing is executed, the control unit 2 designates each of the discharge sections D-1[1] to D-1[6] corresponding to the nozzle array NL-1 as the large amount ink discharge section DF-1, and supplies the print signal SI for designating each of the discharge sections D-2[1] to D-2[6] corresponding to the nozzle array NL-2 as the small amount ink discharge section DF-2 to the head unit 3, and in each of the unit periods TP(4) to TP(6), the control unit 2 designates each of the discharge sections D-1[1] to D-1[6] corresponding to the nozzle array NL-1 as the small amount ink discharge section DF-2, and supplies the print signal SI for designating each of the discharge sections D-2[1] to D-2[6] corresponding to the nozzle array NL-2 as the large amount ink discharge section DF-1 to the head unit 3.

That is, in the present embodiment, in each of the unit periods TP(1) to TP(3), the control unit 2 supplies the supply driving signal Vin-1[1] having the large amount ink ejection waveform PF1 to the discharge section D-1[1] to operate the discharge section D-1[1] as the large amount ink discharge section DF-1 and eject the ink in the cavity CV-1[1] from the nozzle N-1[1] belonging to the nozzle array NL-1. In addition, in each of the unit periods TP(1) to TP(3), the control unit 2 supplies the supply driving signal Vin-2[1] having the small amount ink ejection waveform PF2 to the discharge section D-2[1] to operate the discharge section D-2[1] as the small amount ink discharge section DF-2 and eject the ink in the cavity CV-2[1] from the nozzle N-2[1] belonging to the nozzle array NL-2.

In addition, in each of the unit periods TP(4) to TP(6), the control unit 2 supplies the supply driving signal Vin-1[1]

having the small amount ink ejection waveform PF2 to the discharge section D-1[1] to operate the discharge section D-1[1] as the small amount ink discharge section DF-2 and eject the ink in the cavity CV-1[1] from the nozzle N-1[1] belonging to the nozzle array NL-1. In addition, in each of the unit periods TP(4) to TP(6), the control unit 2 supplies the supply driving signal Vin-2[1] having the large amount ink discharge section DF-1 to the discharge section D-2[1] to operate the discharge section D-2[1] as the large amount ink discharge section DF-1 and eject the ink in the cavity CV-2[1] from the nozzle N-2[1] belonging to the nozzle array NL-2.

In the present embodiment, each of the unit periods TP(1) to TP(3) is an example of a "first period", each of the unit periods TP(4) to TP(6) is an example of a "second period", the piezoelectric element PZ-1[1] is an example of a "one first driving element", the piezoelectric element PZ-2[1] is an example of "one second driving element", the supply driving signal Vin-1[1] supplied in each of the unit periods TP(1) to TP(3) is an example of a "first driving signal", the supply driving signal Vin-2[1] supplied in each of the unit periods TP(1) to TP (3) is an example of a "second driving signal", the supply driving signal Vin-1[1] supplied in the unit periods TP(4) to TP(6) is an example of a "third driving signal", the supply driving signal Vin-2[1] supplied in the unit periods TP(4) to TP(6) is an example of a "fourth driving signal", the large amount ink ejection waveform PF1 is an example of a "first waveform" and a "fourth waveform", and the small amount ink ejection waveform PF2 is an example of a "second waveform" and a "third waveform".

Figure 9:
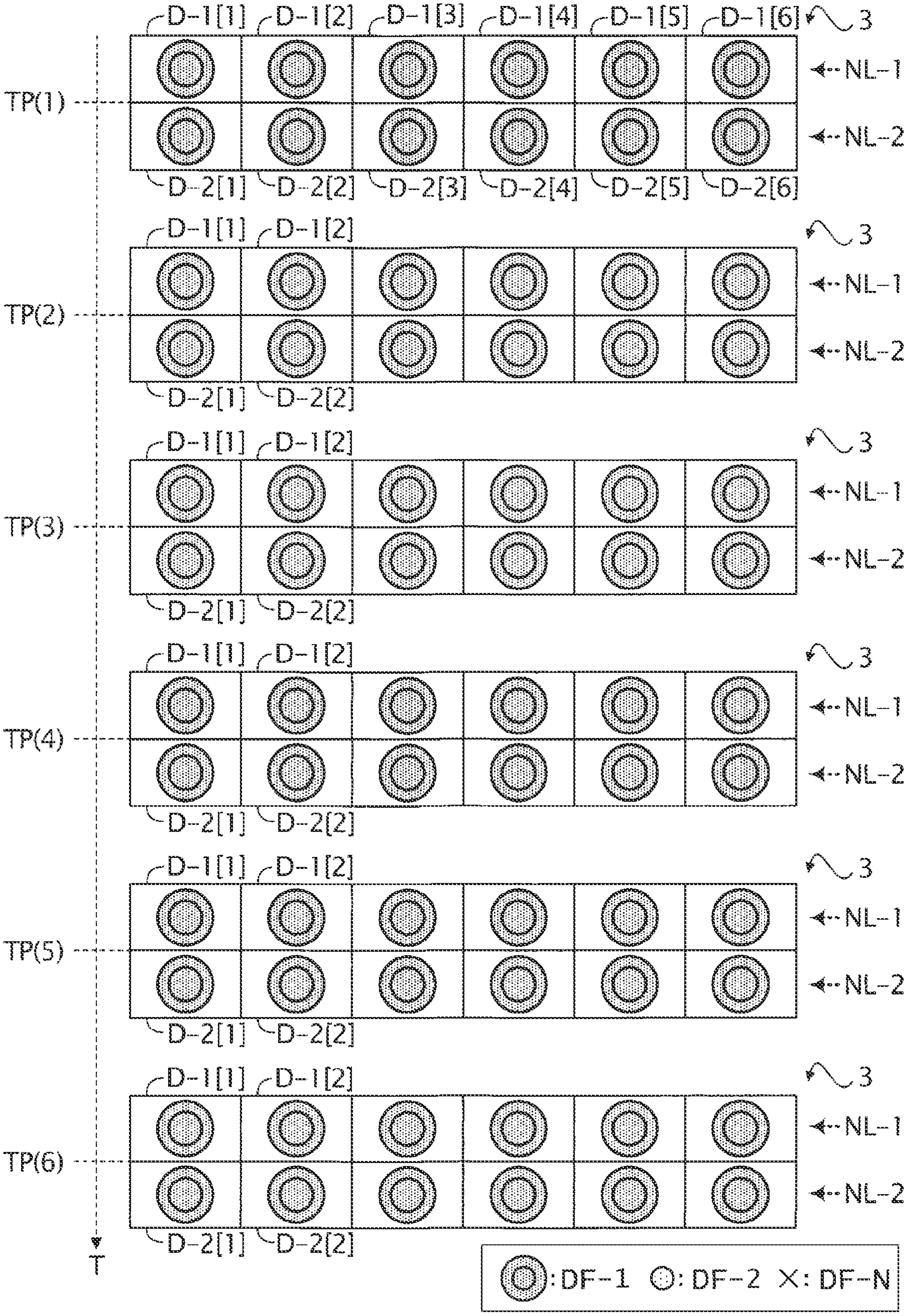
FIG. 9 is an explanatory diagram for explaining flushing processing according to Reference Example 1.

As illustrated in FIG. 9, in each of the unit periods TP(1) to TP(6) during which the flushing processing is executed, the control unit 2 according to Reference Example 1 supplies the print signal SI for designating each of the discharge sections D-1[1] to D-1[6] corresponding to the nozzle array NL-1 and each of the discharge sections D-2[1] to D-2[6] corresponding to the nozzle array NL-2 as the large amount ink discharge section DF-1 to the head unit 3.

Figure 10:
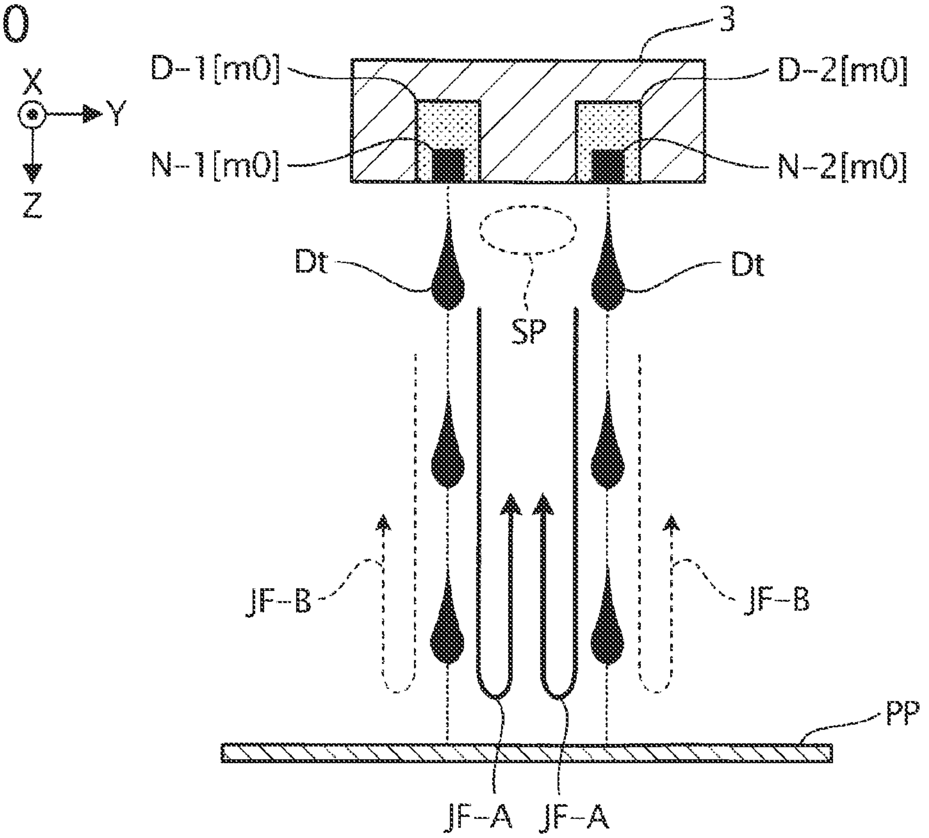
FIG. 10 is an explanatory diagram for explaining an example of liquid droplets flying in the flushing processing according to Reference Example 1.

FIG. 10 illustrates an aspect in which the liquid droplets discharged from the nozzle N-1[m0] and the nozzle N-2[m0] provided in the head unit 3 fly as dots when the flushing processing according to Reference Example 1 is executed. Here, the variable m0 is a natural number that satisfies "$1 \le m0 \le M$". In FIG. 10, the nozzle N-2[m0] is positioned in the +Y direction of the nozzle N-1[m0], and the nozzle N-2[m0] is adjacent to the nozzle N-1[m0] in the Y-axis direction.

In the flushing processing according to Reference Example 1, the discharge section D-1[m0] is driven by the supply driving signal Vin-1[m0] having three waveforms PAA to operate as the large amount ink discharge section DF-1 and continuously discharge three dots Dt in each unit period TP from the nozzle N-1[m0] provided in the discharge section D-1[m0]. Further, in the flushing processing according to Reference Example 1, the discharge section D-2[m0] is driven by the supply driving signal Vin-2[m0] having three waveforms PAA to operate as the large amount ink discharge section DF-1 and continuously discharge three dots Dt in each unit period TP from the nozzle N-2[m0] provided in the discharge section D-2 [m0]. Therefore, in the flushing processing according to Reference Example 1, the density of the flying dots Dt in the space between the head unit 3 and the recording paper sheet PP is high, and the airflow flowing along the flying dots Dt causes the atmospheric pressure of the space positioned between the nozzle N-1[m0] and the nozzle N-2[m0] to be lower than the atmospheric pressure in other spaces around the head unit 3.

Below, the space positioned between the nozzle N-1 [m0] and the nozzle N-2[m0] is referred to as an inter-nozzle pressure reduction space SP. When the discharge section D-1[m0] and the discharge section D-2[m0] operate as the large amount ink discharge section DF-1, the density of the flying dots Dt in the space between the head unit 3 and the recording paper sheet PP is high, and an airflow directed toward the recording paper sheet PP, which is generated around the flying path of the dots Dt discharged from the nozzles N, is generated. Due to the airflow directed toward the recording paper sheet PP, in the inter-nozzle pressure reduction space SP, the atmospheric pressure becomes lower than that of the other spaces around the head unit 3, and thus a strong airflow, which is directed toward the inter-nozzle pressure reduction space SP from the recording paper sheet PP, is generated. Hereinafter, the airflow, which is generated by the discharge of the dots Dt from the nozzles N described above and directed toward the recording paper sheet PP and then directed toward the inter-nozzle pressure reduction space SP, and, is referred to as a self jet flow JF-A.

When the dot Dt is discharged from the nozzle N, the liquid protrudes from the nozzle N toward the recording paper sheet PP while being elongated, and then, the protrusion section is torn off, and the torn part becomes a spherical dot Dt due to surface tension while flying. In the formation of such dots Dt, relatively large main droplets and relatively small satellite droplets or fine mist are generated. The satellite droplets or mist with small masses have little energy when discharged, and thus the attenuation rate of flight speed is high due to air resistance during flight. As a result, the satellite droplets or mist of which the flight speed is reduced and of which linear energy has become zero before reaching the recording paper sheet PP remain in the space and adhere to the head unit 3 along with the airflow of the self jet flow. In Reference Example 1, the mist is picked up by the self jet flow JF-A directed toward the head unit 3 and adheres to the head unit 3. As a result, there was a concern that the areas around the openings of the nozzle N-1[m0] and nozzle N-2[m0] were contaminated with ink that adheres as mist, and ink from the nozzle N-1[m0] and nozzle N-2[m0] could not be discharged normally.

In Reference Example 1, in addition to the inter-nozzle pressure reduction space SP, pressure reduction occurs in the space on the —Y side of the nozzle N-1[m0] and the space on the +Y side of the nozzle N-2[m0]. Hereinafter, the airflow to the space other than the inter-nozzle pressure reduction space SP, which is generated as the dots Dt are discharged from the nozzles N, is referred to as an airflow JF-B. As described above, the inter-nozzle pressure reduction space SP is a space between the region in which the dots Dt discharged from the discharge sections D-1[1] to D-1[6] of the nozzle array NL-1 fly and the region in which the dots Dt discharged from the discharge sections D-2[1] to D-2[6] of the nozzle array NL-2 fly in a space between the head unit 3 and the recording paper sheet PP, and due to the high density of the flying dots Dt and the airflow directed from the nozzle N side toward the recording paper sheet PP, the atmospheric pressure is likely to be lower than in the space other than the inter-nozzle pressure reduction space SP. On the other hand, in the space on the —Y side of the nozzle N-1[m0] and the space on the +Y side of the nozzle N-2[m0], even when an airflow directed toward the recording paper sheet PP is generated around the flying path of the dot Dt on one side, there are no flying dots Dt on the other side, and the density of the dots Dt is low. Thus, the air is easily replenished from the other side, and the atmospheric pressure is unlikely to decrease. Therefore, the self jet flow JF-A becomes a stronger airflow than the airflow JF-B.

Figure 11:
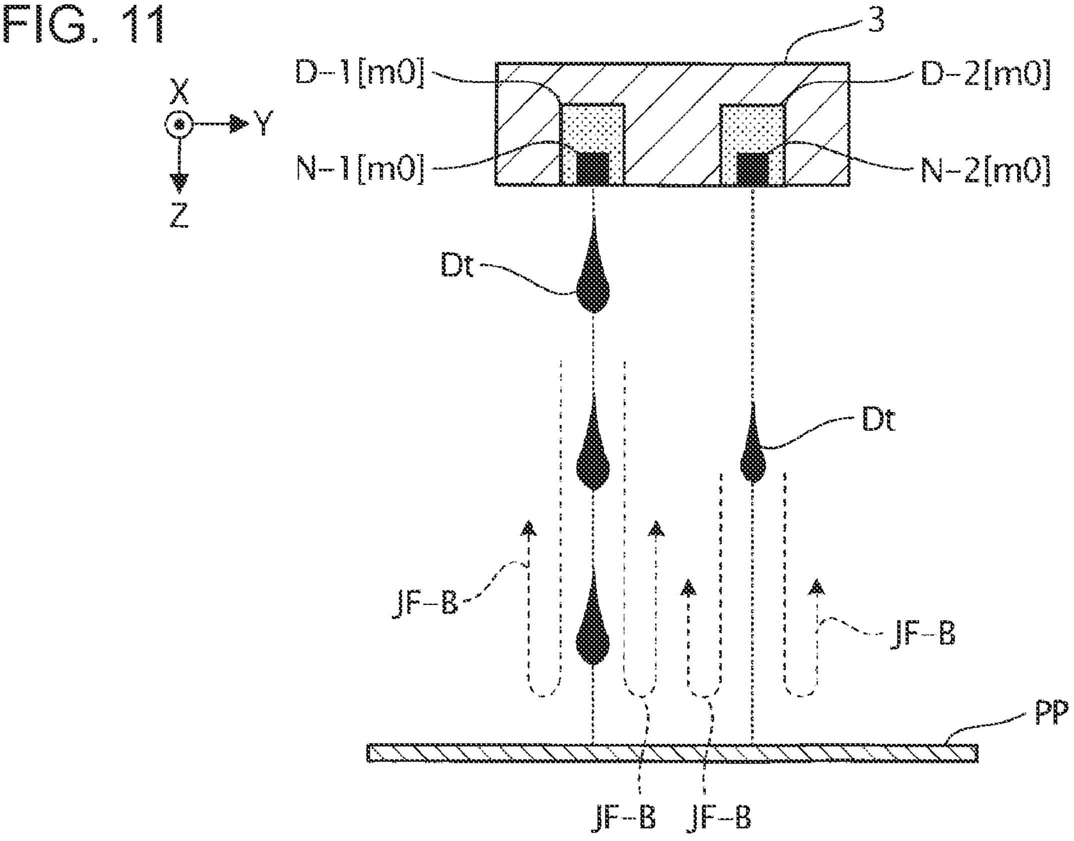
FIG. 11 is an explanatory diagram for explaining an example of liquid droplets flying in the flushing processing according to the embodiment.

FIG. 11 is a schematic view illustrating how liquid droplets discharged from the nozzle N-1[m0] provided in the head unit 3 fly as dots, and how liquid droplets discharged from the nozzle N-2[m0] provided in the head unit 3 fly as dots, when the flushing processing according to the present embodiment is executed.

As illustrated in FIG. 11, in the flushing processing according to the present embodiment, the discharge section D-1[m0] operates as the large amount ink discharge section DF-1, and three dots Dt are continuously discharged from the nozzle N-1[m0] provided in the discharge section D-1[m0] in each unit period TP. On the other hand, in the flushing processing according to the present embodiment, the discharge section D-2[m0] operates as the small amount ink discharge section DF-2, and only one dot Dt is discharged from the nozzle N-2[m0] provided in the discharge section D-2[m0] in each unit period TP. Therefore, in the flushing processing according to the present embodiment, compared to the above-described Reference Example 1, the density of the flying dots Dt in the space between the head unit 3 and the recording paper sheet PP is low, and no inter-nozzle pressure reduction space SP is generated between the nozzle N-1[m0] and the nozzle N-2[m0]. In the flushing processing according to the present embodiment, although the airflow JF-B is generated, the self jet flow JF-A is not generated.

Therefore, in the flushing processing according to the present embodiment, compared to Reference Example 1, the density of the dots Dt discharged from the nozzle N-1[m0] and the nozzle N-2[m0] in the space between the head unit 3 and the recording paper sheet PP is low, the amount of mist rolled up around the nozzle N can be reduced, and the amount of mist adhering to the head unit 3 can be reduced. That is, in the flushing processing according to the present embodiment, compared to Reference Example 1, it is possible to reduce the risk that ink cannot be discharged normally from the nozzle N-1[m0] and the nozzle N-2[m0].

Figure 12:
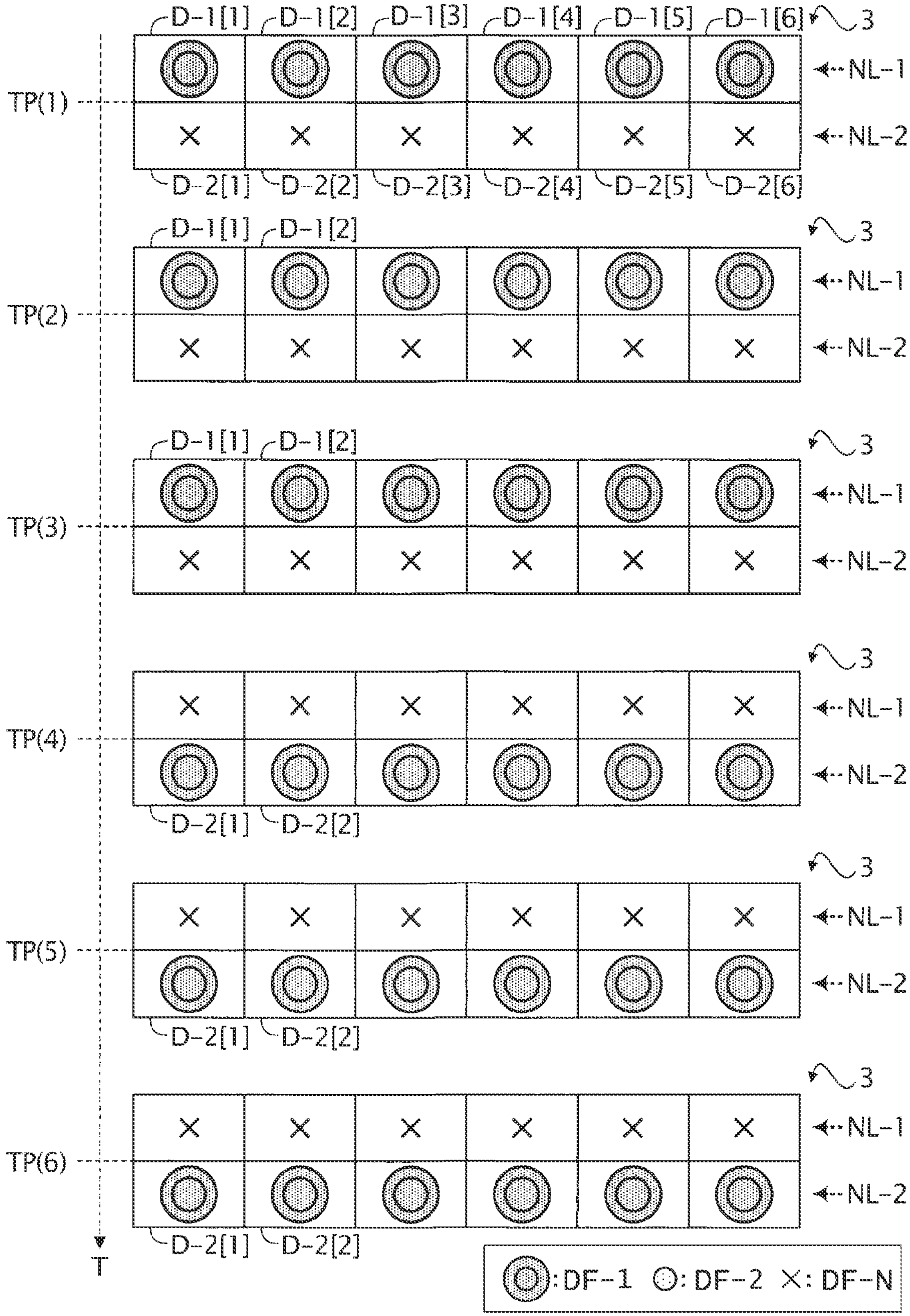
FIG. 12 is an explanatory diagram for explaining flushing processing according to Reference Example 2.

As illustrated in FIG. 12, in each of the unit periods TP(1) to TP(3) among the unit periods TP(1) to TP(6) during which the flushing processing is executed, the control unit 2 according to Reference Example 2 designates each of the discharge sections D-1[1] to D-1[6] corresponding to the nozzle array NL-1 as the large amount ink discharge section DF-1, and supplies the print signal SI for designating each of the discharge sections D-2[1] to D-2[6] corresponding to the nozzle array NL-2 as the ejection restriction discharge section DF-N to the head unit 3, and in each of the unit periods TP(4) to TP(6), the control unit 2 designates each of the discharge sections D-1[1] to D-1[6] corresponding to the nozzle array NL-1 as the ejection restriction discharge section DF-N, and supplies the print signal SI for designating each of the discharge sections D-2[1] to D-2[6] corresponding to the nozzle array NL-2 as the large amount ink discharge section DF-1 to the head unit 3.

As described above, in Reference Example 2, when the discharge section D-1[m0] corresponding to the nozzle N-1[m0] operates as the large amount ink discharge section DF-1, the discharge section D-2[m0] corresponding to the nozzle N-2[m0] operates as the ejection restriction discharge section DF-N, and when the discharge section D-2[m0] corresponding to the nozzle N-2[m0] operates as the large amount ink discharge section DF-1, the discharge section D-1[m0] corresponding to the nozzle N-1[m0] operates as the ejection restriction discharge section DF-N. Therefore, in the flushing processing according to Reference Example 2, the inter-nozzle pressure reduction space SP is not generated between the nozzle N-1[m0] and the nozzle N-2[m0]. Therefore, according to Reference Example 2, compared to Reference Example 1, in the flushing processing, scattering of the dots Dt discharged from the nozzles N as mist can be suppressed.

However, in Reference Example 2, the control unit 2 stops the discharge of ink from the discharge sections D-2[1] to D-2[6] corresponding to the nozzle array NL-2 in the unit periods TP(1) to TP(3) among the unit periods TP(1) to TP(6) during which the flushing processing is executed, and stops the discharge of ink from the discharge sections D-1[1] to D-1[6] corresponding to the nozzle array NL-1 in the unit periods TP(4) to TP(6).

Therefore, in Reference Example 2, the time required for ejecting ink from the head unit 3 as the flushing processing is approximately twice the time required for ejecting ink from the head unit 3 as the flushing processing in Reference Example 1.

On the other hand, the control unit 2 according to the present embodiment executes small amount ink ejection from each of the discharge sections D-2[1] to D-2[6] instead of stopping the discharge of ink from the discharge sections D-2[1] to D-2[6] corresponding to the nozzle array NL-2 in the unit periods TP(1) to TP(3) among the unit periods TP(1) to TP(6) during which the flushing processing is executed, and executes small amount ink ejection from each of the discharge sections D-1[1] to D-1[6] instead of stopping the discharge of ink from the discharge sections D-1[1] to D-1[6] corresponding to the nozzle array NL-1 in the unit periods TP(4) to TP(6). Therefore, according to the present embodiment, compared to Reference Example 2, the time required to eject a desired amount of ink from the head unit 3 in the flushing processing can be shortened. That is, according to the present embodiment, it is possible to achieve both the improvement in print quality by suppressing the generation of mist and the improvement in user convenience by shortening the time required for the flushing processing.

B. Modification Example

Each of the embodiments can be modified in various manners. Specific modifications will be described below. Two or more aspects selected in any manner from the following examples can be appropriately combined with each other within a range not inconsistent with each other. In addition, in the modification examples illustrated below, elements having the same effects and functions as those of the embodiment will be given the reference numerals used in the description above, and the detailed description thereof will be appropriately omitted.

Modification Example 1

In the above-described embodiment, a case where each discharge section D operates as the large amount ink discharge section DF-1 over the plurality of continuous unit periods TP is described, but the present disclosure is not limited to such an aspect. For example, in the flushing processing, each discharge section D may alternately repeat the operation as the large amount ink discharge section DF-1 and the operation as the small amount ink discharge section DF-2 in each unit period TP. For example, when the discharge section D operates as the large amount ink discharge section DF-1 in one unit period TP, the discharge section D may operate as the small amount ink discharge section DF-2 in another unit period TP following the one unit period TP.

Figure 13:
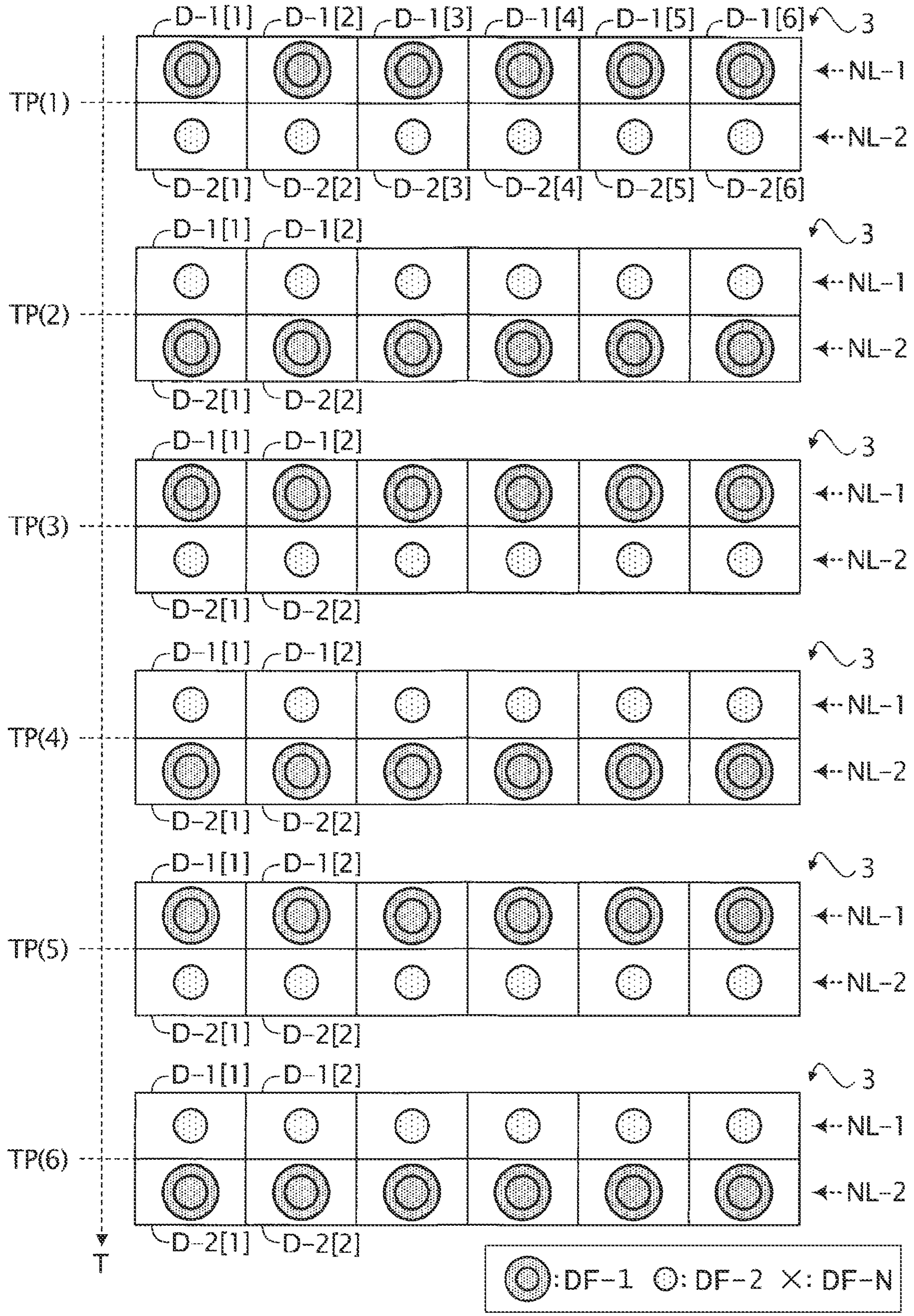
FIG. 13 is an explanatory diagram for explaining flushing processing according to Modification Example 1.

As illustrated in FIG. 13, in each of the odd-numbered unit periods TP(1), TP(3), and TP(5) among the unit periods TP(1) to TP(6) during which the flushing processing is executed, the control unit 2 according to the present modification example designates each of the discharge sections D-1[1] to D-1[6] corresponding to the nozzle array NL-1 as the large amount ink discharge section DF-1, and supplies the print signal SI for designating each of the discharge sections D-2[1] to D-2[6] corresponding to the nozzle array NL-2 as the small amount ink discharge section DF-2 to the head unit 3. In addition, in each of the even-numbered unit periods TP(2), TP(4), and TP(6) among the unit periods TP(1) to TP(6) during which the flushing processing is executed, the control unit 2 according to the present modification example designates each of the discharge sections D-1[1] to D-1[6] corresponding to the nozzle array NL-1 as the small amount ink discharge section DF-2, and supplies the print signal SI for designating each of the discharge sections D-2[1] to D-2[6] corresponding to the nozzle array NL-2 as the large amount ink discharge section DF-1 to the head unit 3.

That is, the control unit 2 according to the present modification example supplies the supply driving signal Vin-1[1] having the large amount ink ejection waveform PF1 to the discharge section D-1[1] in each of the odd-numbered unit periods TP(1), TP(3), and TP(5) to operate the discharge section D-1[1] as the large amount ink discharge section DF-1 and eject the ink in the cavity CV-1[1] from the nozzle N-1[1] belonging to the nozzle array NL-1. In addition, the control unit 2 according to the present modification example supplies the supply driving signal Vin-2[1] having the small amount ink ejection waveform PF2 to the discharge section D-2[1] in each of the odd-numbered unit periods TP(1), TP(3), and TP(5) to operate the discharge section D-2[1] as the small amount ink discharge section DF-2 and eject the ink in the cavity CV-2[1] from the nozzle N-2[1] belonging to the nozzle array NL-2.

In addition, the control unit 2 according to the present modification example supplies the supply driving signals Vin-1[1] to Vin-1[6] having the small amount ink ejection waveform PF2 to the discharge sections D-1[1] to D-1[6] in each of the even-numbered unit periods TP(2), TP(4), and TP(6) to operate the discharge sections D-1[1] to D-1[6] as the small amount ink discharge section DF-2 and eject the ink in the cavities CV-1[1] to CV-1[6] from the nozzles N-1[1] to N-1[6] belonging to the nozzle array NL-1. In addition, the control unit 2 according to the present modification example supplies the supply driving signals Vin-2[1] to Vin-2[6] having the large amount ink ejection waveform PF1 to the discharge sections D-2[1] to D-2[1] in each of the even-numbered unit periods TP(2), TP(4), and TP(6) to operate the discharge sections D-2[1] to D-2[6] as the large amount ink discharge section DF-1 and eject the ink in the cavities CV-2[1] to CV-2[6] from the nozzles N-2[1] to N-2[6] belonging to the nozzle array NL-2.

Figure 14:
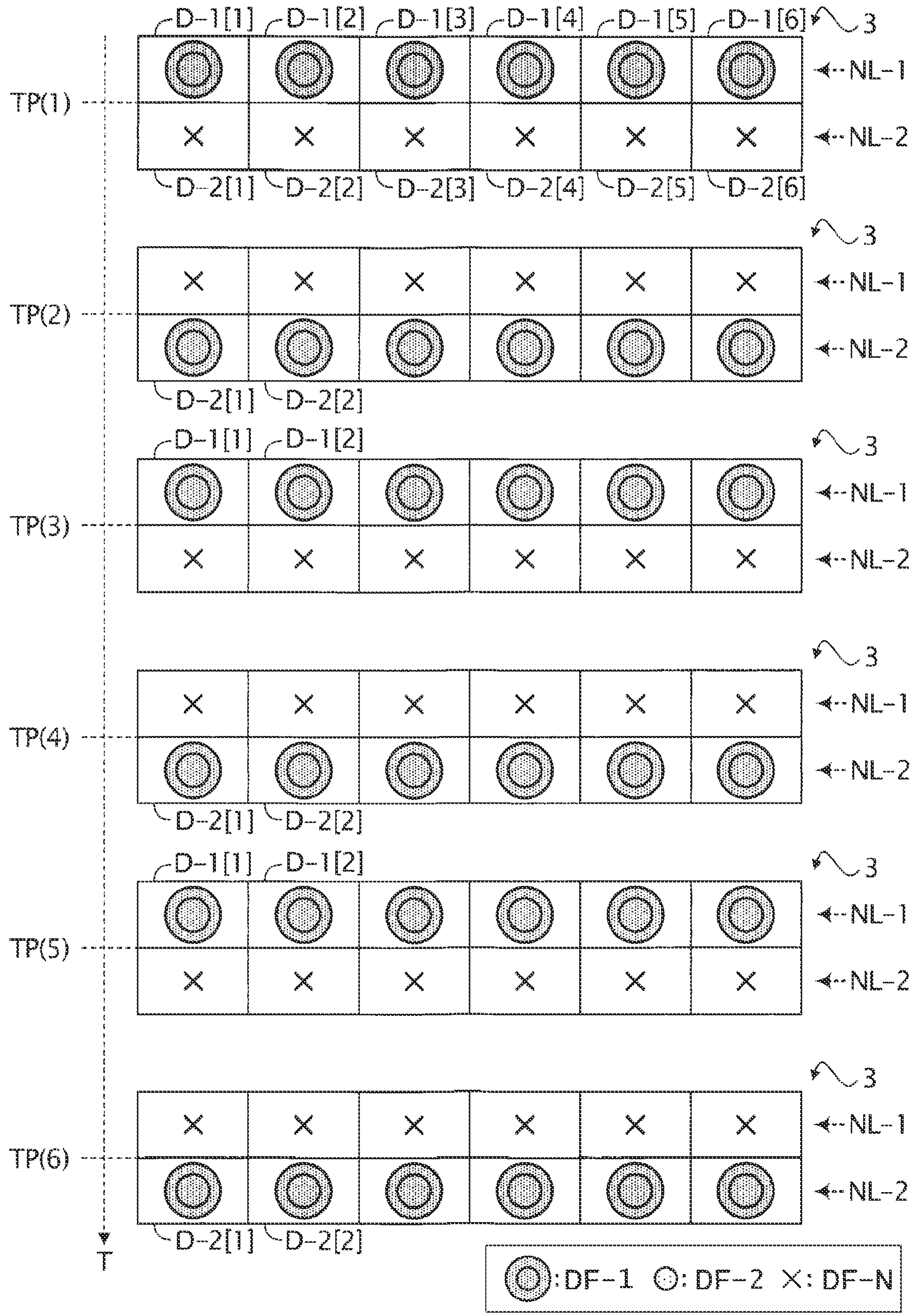
FIG. 14 is an explanatory diagram for explaining flushing processing according to Reference Example 3.

As illustrated in FIG. 14, in each of the odd-numbered unit periods TP(1), TP(3), and TP(5) among the unit periods TP(1) to TP(6) during which the flushing processing is executed, the control unit 2 according to Reference Example 3 designates each of the discharge sections D-1[1] to D-1[6] corresponding to the nozzle array NL-1 as the large amount ink discharge section DF-1, and supplies the print signal SI for designating each of the discharge sections D-2[1] to D-2[6] corresponding to the nozzle array NL-2 as the ejection restriction discharge section DF-N to the head unit 3. In addition, the control unit 2 according to Reference Example 3 designates each of the discharge sections D-1[1] to D-1[6] corresponding to the nozzle array NL-1 as the ejection restriction discharge section DF-N, and supplies the print signal SI for designating each of the discharge sections D-2[1] to D-2[6] corresponding to the nozzle array NL-2 as the large amount ink discharge section DF-1 to the head unit 3 in each of the even-numbered unit periods TP(2), TP(4), and TP(6) among the unit periods TP(1) to TP(6) during which the flushing processing is executed.

That is, in Reference Example 3, the control unit 2 stops the discharge of ink from the discharge sections D-2[1] to D-2[6] corresponding to the nozzle array NL-2 in the odd-numbered unit periods TP(1), TP(3), and TP(5) among the unit periods TP(1) to TP(6) during which the flushing processing is executed, and stops the discharge of ink from the discharge sections D-1[1] to D-1[6] corresponding to the nozzle array NL-1 in the even-numbered unit periods TP(2), TP(4), and TP(6).

Therefore, in Reference Example 3, compared to Reference Example 1, the time required to eject a desired amount of ink from the head unit 3 in the flushing processing can be lengthened.

On the other hand, the control unit 2 according to the present modification example executes small amount ink ejection from each of the discharge sections D-2[1] to D-2[6] instead of stopping the discharge of ink from the discharge sections D-2[1] to D-2[6] corresponding to the nozzle array NL-2 in the odd-numbered unit periods TP(1), TP(3), and TP(5) among the unit periods TP(1) to TP(6) during which the flushing processing is executed, and executes small amount ink ejection from each of the discharge sections D-1[1] to D-1[6] instead of stopping the discharge of ink from the discharge sections D-1[1] to D-1[6] corresponding to the nozzle array NL-1 in the even-numbered unit periods TP(2), TP(4), and TP(6). Therefore, according to the present embodiment, compared to Reference Example 3, the time required to eject a desired amount of ink from the head unit 3 in the flushing processing can be shortened. Further, the density of the dots Dt in the space between the head unit 3 and the recording paper sheet PP is not increased, and the generation of a strong airflow toward the inter-nozzle pressure reduction space SP can be suppressed. That is, according to the present embodiment, it is possible to achieve both the improvement in print quality by suppressing the adhesion of mist around the nozzle N and the improvement in user convenience by shortening the time required for the flushing processing.

As described above, in the present modification example, in the unit period TP(1), the control unit 2 supplies the supply driving signal Vin-1[1] having the large amount ink ejection waveform PF1 to the piezoelectric element PZ-1[1] among the piezoelectric elements PZ-1[1] to PZ-1[6] to eject the liquid in the cavity CV-1[1] from the nozzle N-1[1], and supplies the supply driving signal Vin-2[1] having the small amount ink ejection waveform PF2 different from the large amount ink ejection waveform PF1 to the piezoelectric element PZ-2[1] among the piezoelectric elements PZ-2[1] to PZ-2[6] to eject the liquid in the cavity CV-2[1] from the nozzle N-2[1], and in the unit period TP(2), the control unit 2 supplies the supply driving signal Vin-1[1] having the small amount ink ejection waveform PF2 different from the large amount ink ejection waveform PF1 to the piezoelectric element PZ-1[1] to eject the liquid in the cavity CV-1[1] from the nozzle N-1[1], and supplies the supply driving signal Vin-2[1] having the large amount ink ejection waveform PF1 different from the small amount ink ejection waveform PF2 to the piezoelectric element PZ-2[1] to eject the liquid in the cavity CV-2[1] from the nozzle N-2[1].

Therefore, according to the present modification example, compared to the aspect of Reference Example 1, the density of the dots Dt of ink discharged from the nozzle N-1[1] and the nozzle N-2[1] in the space between the head unit 3 and the recording paper sheet PP is low, the amount of mist rolled up around the nozzle N can be reduced, and the deterioration in print quality caused by mist can be suppressed.

Moreover, according to the present modification example, compared to the aspect of Reference Example 3, it is possible to shorten the time required for the flushing processing.

In the present modification example, the unit period TP(1) is an example of a "first period", the unit period TP(2) is an example of a "second period", the piezoelectric element PZ-1[1] is an example of a "one first driving element", the piezoelectric element PZ-2[1] is an example of "one second driving element", the supply driving signal Vin-1[1] supplied in the unit period TP(1) is an example of a "first driving signal", the supply driving signal Vin-2[1] supplied in the unit period TP(1) is an example of a "second driving signal", the supply driving signal Vin-1[1] supplied in the unit period TP(2) is an example of a "third driving signal", the supply driving signal Vin-2[1] supplied in the unit period TP(2) is an example of a "fourth driving signal", the large amount ink ejection waveform PF1 is an example of a "first waveform" and a "fourth waveform", and the small amount ink ejection waveform PF2 is an example of a "second waveform" and a "third waveform".

In addition, in the present modification example, the supply driving signal Vin-1[1] supplied in the unit period TP(1) includes three waveforms PAA, the supply driving signal Vin-2[1] supplied in the unit period TP(1) includes one waveform PAA, the supply driving signal Vin-1[1] supplied in the unit period TP(2) includes one waveform PAA, and the supply driving signal Vin-2[1] supplied in the unit period TP(2) includes three waveforms PAA.

Therefore, according to the present modification example, compared to Reference Example 1, the amount of mist generated from the ink discharged from the nozzle N-1[1] and the nozzle N-2[1] is reduced, and further, the rolling-up around the nozzle N of mist generated from the dots Dt discharged from the nozzle N-1[m0] and the nozzle N-2[m0] can be suppressed, and the deterioration in print quality caused by mist can be suppressed. Moreover, according to the present modification example, compared to Reference Example 3, it is possible to shorten the time required for the flushing processing.

Modification Example 2

In the above-described embodiment and Modification Example 1, an aspect in which, in each unit period TP, the supply driving signals Vin-1[1] to Vin-1[M] having the same waveform are supplied to the discharge sections D-1[1] to D-1[M] corresponding to the nozzles N-1[1] to N-1[M] belonging to the nozzle array NL-1, and the supply driving signals Vin-2[1] to Vin-2[M] having the same waveform are supplied to the discharge sections D-2[1] to D-2[M] corresponding to the nozzles N-2[1] to N-2[M] belonging to the nozzle array NL-2, was exemplified, but the present disclosure is not limited to such aspects. For example, in each unit period TP, one supply driving signal Vin-1 and another supply driving signal Vin-1 among the supply driving signals Vin-1[1] to Vin-1[M] supplied to the discharge sections D-1[1] to D-1[M] may have different waveforms, and one supply driving signal Vin-2 and another supply driving signal Vin-2 among the supply driving signals Vin-2[1] to Vin-2 [M] supplied to the discharge sections D-2[1] to D-2[M] may have different waveforms. Further, for example, the supply driving signal Vin-1 supplied to one discharge section D-1 and the supply driving signal Vin-1 supplied to another discharge section D-1 adjacent to the one discharge section D-1 among the discharge sections D-1[1] to D-1[M] may have different waveforms, and the supply driving signal Vin-2 supplied to one discharge section D-2 and the supply driving signal Vin-2 supplied to another discharge section D-2 adjacent to the one discharge section D-2 among the discharge sections D-2[1] to D-2[M] may have different waveforms.

Figure 15:
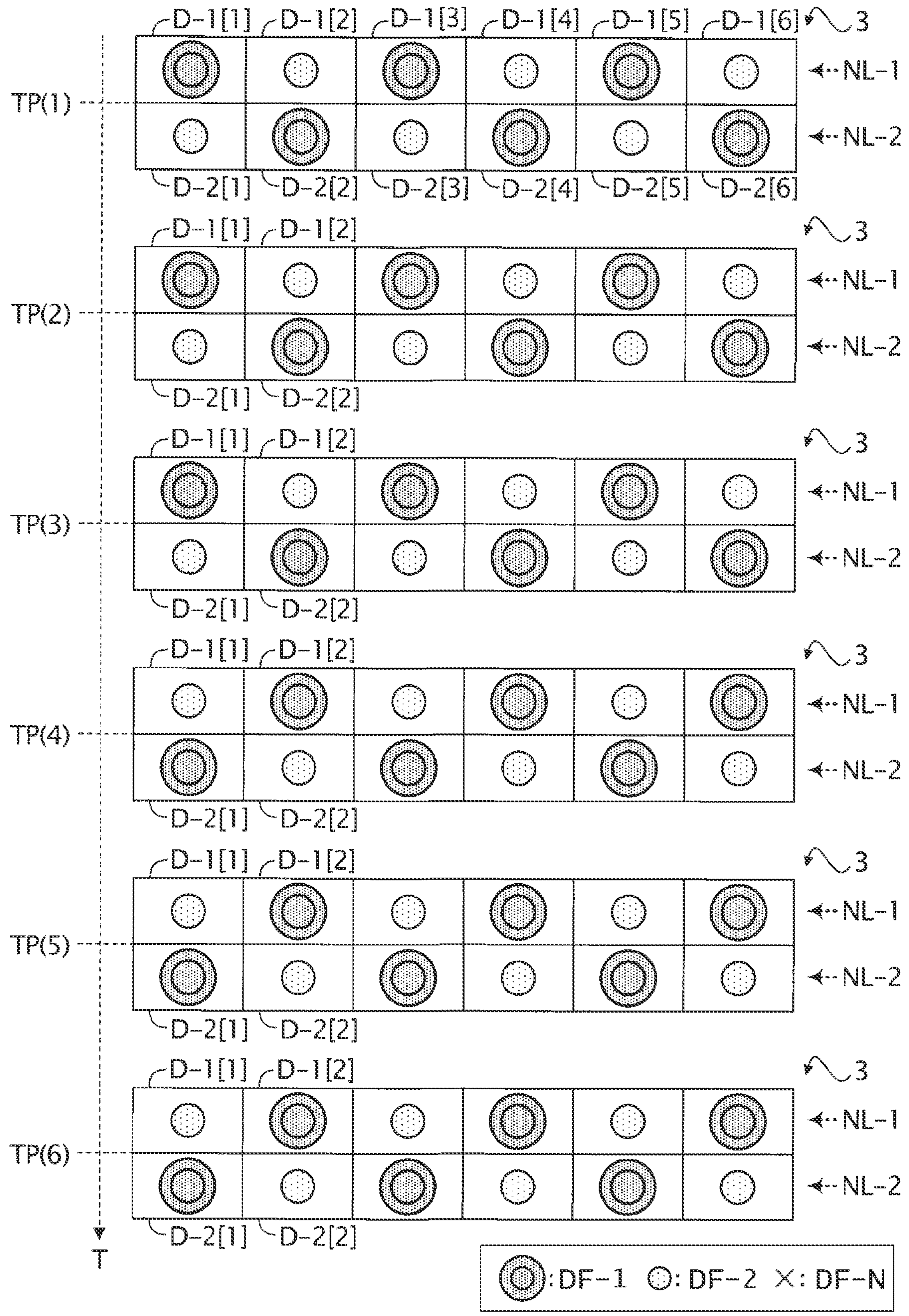
FIG. 15 is an explanatory diagram for explaining flushing processing according to Modification Example 2.

According to the present modification example illustrated in FIG. 15, in each of the unit periods TP(1) to TP(3) among the unit periods TP(1) to TP(6) during which the flushing processing is executed, the control unit 2 designates each of the odd-numbered discharge sections D-1[1], D-1[3], and D-1[5] as the large amount ink discharge section DF-1, and designates each of the even-numbered discharge sections D-1[2], D-1[4], and D-1[6] as the small amount ink discharge section DF-2 among the discharge sections D-1[1] to D-1[6] corresponding to the nozzle array NL-1, and designates each of the odd-numbered discharge sections D-2[1], D-2[3], and D-2[5] as the small amount ink discharge section DF-2, and supplies the print signal SI for designating each of the even-numbered discharge sections D-2[2], D-2[4], and D-2[6] as the large amount ink discharge section DF-1 to the head unit 3 among the discharge sections D-2[1] to D-2[6] corresponding to the nozzle array NL-2. In addition, in each of the unit periods TP(4) to TP(6) among the unit periods TP(1) to TP(6) during which the flushing processing is executed, the control unit 2 according to the present modification example designates each of the odd-numbered discharge sections D-1[1], D-1[3], and D-1[5] as the small amount ink discharge section DF-2, and designates each of the even-numbered discharge sections D-1[2], D-1[4], and D-1[6] as the large amount ink discharge section DF-1 among the discharge sections D-1[1] to D-1[6] corresponding to the nozzle array NL-1, and designates each of the odd-numbered discharge sections D-2[1], D-2[3], and D-2[5] as the large amount ink discharge section DF-1, and supplies the print signal SI for designating each of the even-numbered discharge sections D-2[2], D-2[4], and D-2[6] as the small amount ink discharge section DF-2 to the head unit 3 among the discharge sections D-2[1] to D-2[6] corresponding to the nozzle array NL-2.

Figure 16:
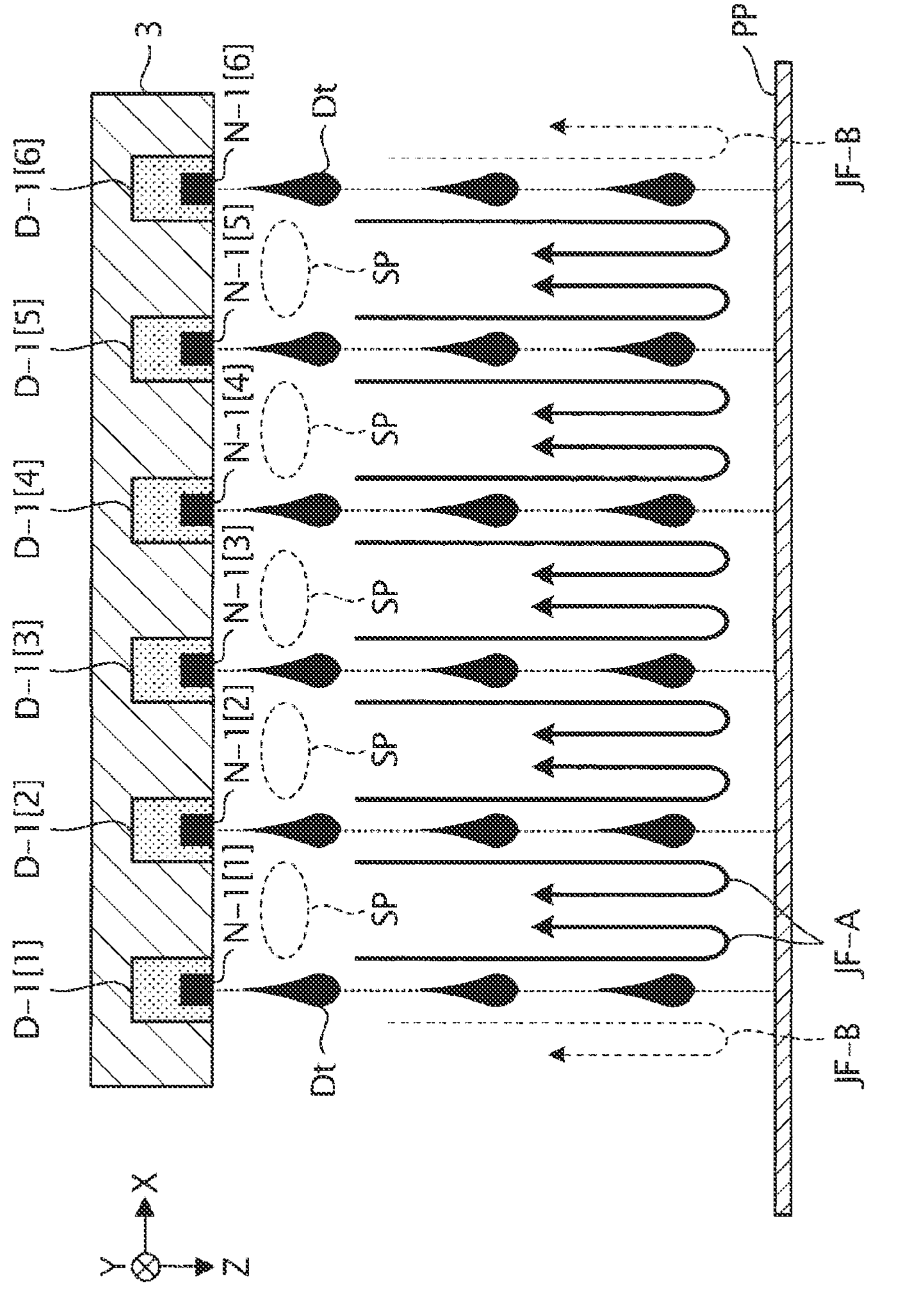
FIG. 16 is an explanatory diagram for explaining an example of liquid droplets flying in the flushing processing according to Reference Example 1.

As illustrated in FIG. 16, in the flushing processing according to Reference Example 1, the discharge section D-1[1] to D-1[6] is driven by the supply driving signal Vin-1[m0] having three waveforms PAA to operate as the large amount ink discharge section DF-1 and continuously discharge three dots Dt in each unit period TP from the nozzle N-1[1] to N-1[6] corresponding to the discharge sections D-1[1] to D-1[6]. Therefore, in the flushing processing according to Reference Example 1, the density of the dots Dt in the space between the head unit 3 and the recording paper sheet PP is high, and the inter-nozzle pressure reduction spaces SP are generated between the nozzle N-1[1] and the nozzle N-1[2], between the nozzle N-1[2] and the nozzle N-1[3], between the nozzle N-1[3] and the nozzle N-1[4], between the nozzle N-1[4] and nozzle N-1[5], and between the nozzle N-1[5] and nozzle N-1[6]. Accordingly, in the flushing processing according to Reference Example 1, the self jet flows JF-A are generated between the nozzle N-1[1] and the nozzle N-1[2], between the nozzle N-1[2] and the nozzle N-1[3], between the nozzle N-1[3] and the nozzle N-1[4], between the nozzle N-1[4] and nozzle N-1[5], and between the nozzle N-1[5] and nozzle N-1[6]. Therefore, in the flushing processing according to Reference Example 1, the head unit 3 may be contaminated with the ink that has adhered as mist, and there is a concern that the ink cannot be discharged normally from the head unit 3.

Figure 17:
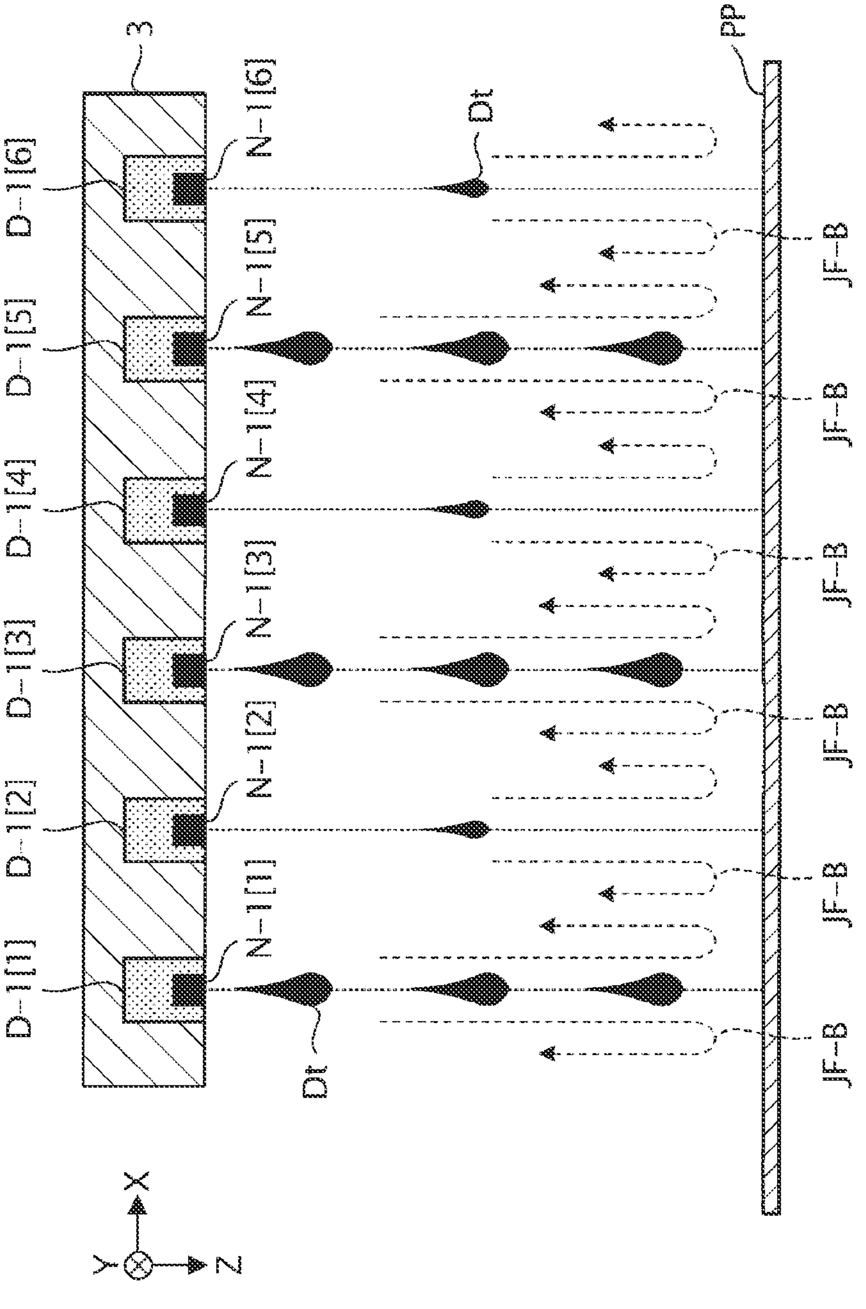
FIG. 17 is an explanatory diagram for explaining an example of liquid droplets flying in the flushing processing according to Modification Example 2.

In the flushing processing according to the present modification example illustrated in FIG. 17, for example, in the unit period TP(1), each of the odd-numbered discharge sections D-1[1], D-1[3], and D-1[5] among the discharge sections D-1[1] to D-1[6] is driven by the supply driving signals Vin-1[1], Vin-1[3] and Vin-1[5] having three waveforms PAA to operate as the large amount ink discharge section DF-1, but each of the even-numbered discharge sections D-1[2], D-1[4], and D-1[6] is driven by the supply driving signals Vin-1[2], Vin-1[4] and Vin-1[6] having one waveform PAA to operate as the small amount ink discharge section DF-2. Therefore, in the flushing processing according to the present modification example, according to the case of the above-described Reference Example 1, the density of the dots Dt in the space between the head unit 3 and the recording paper sheet PP is low, the airflow JF-B is generated, but the self jet flow JF-A is not generated.

Therefore, in the flushing processing according to the present modification example, compared to Reference Example 1, the density of the dots Dt discharged from the nozzles N-1[1] to N-1[6] in the space between the head unit 3 and the recording paper sheet PP is low, the amount of mist rolled up around the nozzle N can be reduced, and the amount of mist adhering to the head unit 3 can be reduced. Similarly, in the flushing processing according to the present modification example, according to Reference Example 1, the density of the dots Dt discharged from the nozzles N-2[1] to N-2[6] in the space between the head unit 3 and the recording paper sheet PP is low, the amount of mist rolled up around the nozzle N can be reduced, and the amount of mist adhering to the head unit 3 can be reduced. That is, in the flushing processing according to the present modification example, compared to Reference Example 1, it is possible to reduce the risk that ink cannot be discharged normally from the nozzles N.

Modification Example 3

In the above-described modification example 2, an example in which the discharge section D operates as the large amount ink discharge section DF-1 over the plurality of continuous unit periods TP, but the present disclosure is not limited to such an aspect. For example, in the flushing processing, the discharge section D may alternately repeat the operation as the large amount ink discharge section DF-1 and the operation as the small amount ink discharge section DF-2 in each unit period TP.

Figure 18:
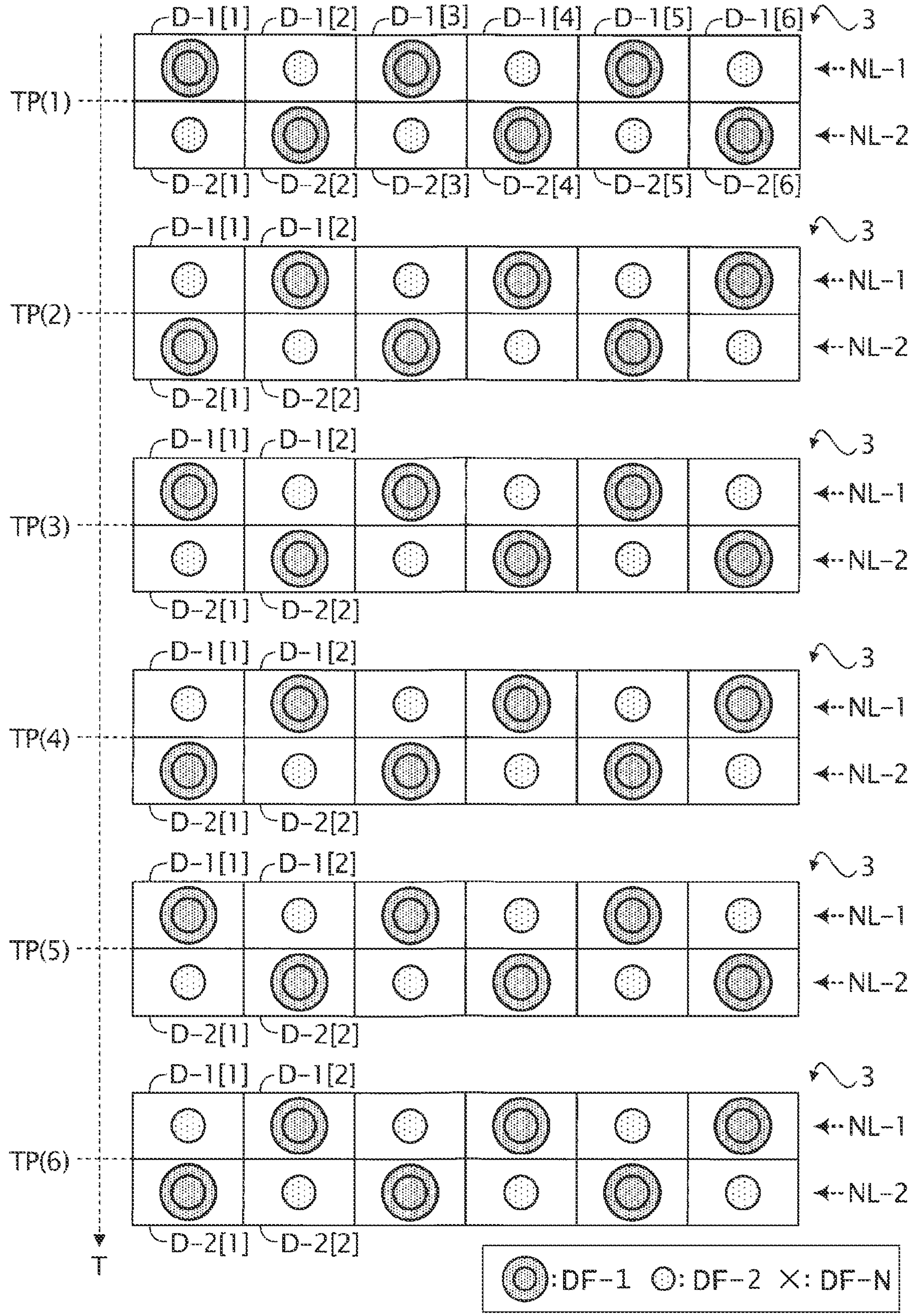
FIG. 18 is an explanatory diagram for explaining flushing processing according to Modification Example 3.

According to the present modification example illustrated in FIG. 18, in each of the odd-numbered unit periods TP(1), TP(3), and TP(5) among the unit periods TP(1) to TP(6) during which the flushing processing is executed, the control unit 2 designates each of the odd-numbered discharge sections D-1[1], D-1[3], and D-1[5] as the large amount ink discharge section DF-1, and designates each of the even-numbered discharge sections D-1[2], D-1[4], and D-1[6] as the small amount ink discharge section DF-2 among the discharge sections D-1[1] to D-1[6] corresponding to the nozzle array NL-1, and designates each of the odd-numbered discharge sections D-2[1], D-2[3], and D-2[5] as the small amount ink discharge section DF-2, and supplies the print signal SI for designating each of the even-numbered discharge sections D-2[2], D-2[4], and D-2[6] as the large amount ink discharge section DF-1 to the head unit 3 among the discharge sections D-2[1] to D-2[6] corresponding to the nozzle array NL-2. In addition, in each of the even-numbered unit periods TP (2), TP(4), and TP(6) among the unit periods TP(1) to TP(6) during which the flushing processing is executed, the control unit 2 according to the present modification example designates each of the odd-numbered discharge sections D-1[1], D-1[3], and D-1[5] as the small amount ink discharge section DF-2, and designates each of the even-numbered discharge sections D-1[2], D-1[4], and D-1[6] as the large amount ink discharge section DF-1 among the discharge sections D-1[1] to D-1[6] corresponding to the nozzle array NL-1, and designates each of the odd-numbered discharge sections D-2[1], D-2[3], and D-2[5] as the large amount ink discharge section DF-1, and supplies the print signal SI for designating each of the even-numbered discharge sections D-2[2], D-2[4], and D-2[6] as the small amount ink discharge section DF-2 to the head unit 3 among the discharge sections D-2[1] to D-2[6] corresponding to the nozzle array NL-2.

That is, the control unit 2 according to the present modification example supplies the supply driving signals Vin-1[1], Vin-1[3], and Vin-1[5] having the large amount ink ejection waveform PF1 to the discharge sections D-1[1], D-1[3], and D-1[5] in each of the odd-numbered unit periods TP(1), TP(3), and TP(5) to operate the discharge sections D-1[1], D-1[3], and D-1[5] as the large amount ink discharge section DF-1 and eject the ink in the cavities CV-1[1], CV-1[3], and CV-1[5] from the nozzles N-1[1], N-1[3], and N-1[5] belonging to the nozzle array NL-1. In addition, the control unit 2 according to the present modification example supplies the supply driving signals Vin-1[2], Vin-1[4], and Vin-1[6] having the small amount ink ejection waveform PF2 to the discharge sections D-1[2], D-1[4], and D-1[6] in each of the odd-numbered unit periods TP(1), TP(3), and TP(5) to operate the discharge sections D-1[2], D-1[4], and D-1[6] as the small amount ink discharge section DF-2 and eject the ink in the cavities CV-1[2], CV-1[4], and CV-1[6] from the nozzles N-1[2], N-1[4], and N-1[6] belonging to the nozzle array NL-1. In addition, the control unit 2 according to the present modification example supplies the supply driving signals Vin-2[1], Vin-2[3], and Vin-2[5] having the small amount ink ejection waveform PF2 to the discharge sections D-2[1], D-2[3], and D-2[5] in each of the odd-numbered unit periods TP(1), TP(3), and TP(5) to operate the discharge sections D-2[1], D-2[3], and D-2[5] as the small amount ink discharge section DF-2 and eject the ink in the cavities CV-2[1], CV-2[3], and CV-2[5] from the nozzles N-2[1], N-2[3], and N-2[5] belonging to the nozzle array NL-2. In addition, the control unit 2 according to the present modification example supplies the supply driving signals Vin-2[2], Vin-2[4], and Vin-2[6] having the large amount ink ejection waveform PF1 to the discharge sections D-2[2], D-2[4], and D-2[6] in each of the odd-numbered unit periods TP(1), TP(3), and TP(5) to operate the discharge sections D-2[2], D-2[4], and D-2[6] as the large amount ink discharge section DF-1 and eject the ink in the cavities CV-2[2], CV-2[4], and CV-2[6] from the nozzles N-2[2], N-2[4], and N-2[6] belonging to the nozzle array NL-2.

In addition, in each of the even-numbered unit periods TP(2), TP(4), and TP(6), the control unit 2 according to the present modification example supplies the supply driving signals Vin-1[1], Vin-1[3], and Vin-1[5] having the small amount ink ejection waveform PF2 to the discharge sections D-1[1], D-1[3], and D-1[5] to operate the discharge sections D-1[1], D-1[3], and D-1[5] as the small amount ink discharge section DF-2 and eject the ink in the cavities CV-1[1], CV-1[3], and CV-1[5] from the nozzles N-1[1], N-1[3], and N-1[5] belonging to the nozzle array NL-1. In addition, in each of the even-numbered unit periods TP(2), TP(4), and TP(6), the control unit 2 according to the present modification example supplies the supply driving signals Vin-1[2], Vin-1[4], and Vin-1[6] having the large amount ink ejection waveform PF1 to the discharge sections D-1[2], D-1[4], and D-1[6] to operate the discharge sections D-1[2], D-1[4], and D-1[6] as the large amount ink discharge section DF-1 and eject the ink in the cavities CV-1[2], CV-1[4], and CV-1[6] from the nozzles N-1[2], N-1[4], and N-1[6] belonging to the nozzle array NL-1. In addition, in each of the even-numbered unit periods TP(2), TP(4), and TP(6), the control unit 2 according to the present modification example supplies the supply driving signals Vin-2[1], Vin-2[3], and Vin-2[5] having the large amount ink ejection waveform PF1 to the discharge sections D-2[1], D-2[3], and D-2[5] to operate the discharge sections D-2[1], D-2[3], and D-2[5] as the large amount ink discharge section DF-1 and eject the ink in the cavities CV-2[1], CV-2[3], and CV-2[5] from the nozzles N-2[1], N-2[3], and N-2[5] belonging to the nozzle array NL-2. In addition, the control unit 2 according to the present modification example supplies the supply driving signals Vin-2[2], Vin-2[4], and Vin-2[6] having the small amount ink ejection waveform PF2 to the discharge sections D-2[2], D-2[4], and D-2[6] in each of the even-numbered unit periods TP(2), TP(4), and TP(6) to operate the discharge sections D-2[2], D-2[4], and D-2[6] as the small amount ink discharge section DF-2 and eject the ink in the cavities CV-2[2], CV-2[4], and CV-2[6] from the nozzles N-2[2], N-2[4], and N-2[6] belonging to the nozzle array NL-2.

As described above, in the present modification example, in the unit period TP(1), the control unit 2 supplies the supply driving signal Vin-1[1] having the large amount ink ejection waveform PF1 to the piezoelectric element PZ-1[1] among the piezoelectric elements PZ-1[1] to PZ-1[6] corresponding to the nozzles N-1[1] to N-1[6] belonging to the nozzle array NL-1 to eject the liquid in the cavity CV-1[1] from the nozzle N-1[1], and supplies the supply driving signal Vin-1[2] having the small amount ink ejection waveform PF2 different from the large amount ink ejection waveform PF1 to the piezoelectric element PZ-1[2] to eject the liquid in the cavity CV-1[2] from the nozzle N-1[2], and in the unit period TP(2), the control unit 2 supplies the supply driving signal Vin-1[1] having the small amount ink ejection waveform PF2 to the piezoelectric element PZ-1[1] to eject the liquid in the cavity CV-1[1] from the nozzle N-1[1], and supplies the supply driving signal Vin-1[2] having the large amount ink ejection waveform PF1 different from the small amount ink ejection waveform PF2 to the piezoelectric element PZ-1[2] to eject the liquid in the cavity CV-1[2] from the nozzle N-1[2].

Therefore, according to the present modification example, compared to the aspect of Reference Example 1, the density of the dots Dt of ink discharged from the nozzle N-1[1] and the nozzle N-1[2] in the space between the head unit 3 and the recording paper sheet PP is low, the amount of mist rolled up around the nozzle N can be reduced, and the deterioration in print quality caused by mist can be suppressed.

In the present modification example, the piezoelectric element PZ-1[1] is an example of a "one first driving element", the piezoelectric element PZ-1[2] is an example of "another first driving element", the supply driving signal Vin-1[1] supplied in the unit period TP(1) is an example of a "first driving signal", the supply driving signal Vin-1[2] supplied in the unit period TP(1) is an example of a "second driving signal", the supply driving signal Vin-1[1] supplied in the unit period TP(2) is an example of a "third driving signal", the supply driving signal Vin-1[2] supplied in the unit period TP(2) is an example of a "fourth driving signal", the large amount ink ejection waveform PF1 is an example of a "first waveform" and a "fourth waveform", and the small amount ink ejection waveform PF2 is an example of a "second waveform" and a "third waveform".

In addition, in the present modification example, the supply driving signal Vin-1[1] supplied in the unit period TP(1) includes three waveforms PAA, the supply driving signal Vin-1[2] supplied in the unit period TP(1) includes one waveform PAA, the supply driving signal Vin-1[1] supplied in the unit period TP(2) includes one waveform PAA, and the supply driving signal Vin-1[2] supplied in the unit period TP(2) includes three waveforms PAA.

Therefore, according to the present modification example, compared to Reference Example 1, the density of the dots Dt of ink discharged from the nozzle N-1[1] and the nozzle N-1[2] in the space between the head unit 3 and the recording paper sheet PP is low, the amount of mist rolled up around the nozzle N can be reduced, and the deterioration in print quality caused by mist can be suppressed.

In addition, in the present modification example, in the unit period TP(1), the control unit 2 supplies the supply driving signals Vin-1[1], Vin-1[3], and Vin-1[5] having the large amount ink ejection waveform PF1 to the odd-numbered piezoelectric elements PZ-1[1], PZ-1[3], and PZ-1[5] among the piezoelectric elements PZ-1[1] to PZ-1[6] corresponding to the nozzles N-1[1] to N-1[6] belonging to the nozzle array NL-1 to eject the liquid in the cavities CV-1[1], CV-1[3], and CV-1[5] from the nozzles N-1[1], N-1[3], and N-1[5]. In the unit period TP(1), the control unit 2 supplies the supply driving signals Vin-1[2], Vin-1[4], and Vin-1[6] having the small amount ink ejection waveform PF2 different from the large amount ink ejection waveform PF1 to the even-numbered piezoelectric elements PZ-1[2], PZ-1[4], and PZ-1[6] among the piezoelectric elements PZ-1[1] to PZ-1[6] corresponding to the nozzles N-1[1] to N-1[6] belonging to the nozzle array NL-1 to eject the liquid in the cavities CV-1[2], CV-1[4], and CV-1[6] from the nozzles N-1[2], N-1[4], and N-1[6]. In the unit period TP(2), the control unit 2 supplies the supply driving signals Vin-1[1], Vin-1[3], and Vin-1[5] having the small amount ink ejection waveform PF2 to the odd-numbered piezoelectric elements PZ-1[1], PZ-1[3], and PZ-1[5] among the piezoelectric elements PZ-1[1] to PZ-1[6] corresponding to the nozzles N-1[1] to N-1[6] belonging to the nozzle array NL-1 to eject the liquid in the cavities CV-1[1], CV-1[3], and CV-1[5] from the nozzles N-1[1], N-1[3], and N-1[5]. In the unit period TP(2), the control unit 2 supplies the supply driving signals Vin-1[2], Vin-1[4], and Vin-1[6] having the large amount ink ejection waveform PF1 different from the small amount ink ejection waveform PF2 to the even-numbered piezoelectric elements PZ-1[2], PZ-1[4], and PZ-1[6] among the piezoelectric elements PZ-1[1] to PZ-1[6] corresponding to the nozzles N-1[1] to N-1[6] belonging to the nozzle array NL-1 to eject the liquid in the cavities CV-1[2], CV-1[4], and CV-1[6] from the nozzles N-1[2], N-1[4], and N-1[6].

Therefore, according to the present modification example, compared to Reference example 1, it is possible to suppress deterioration in print quality caused by mist. Moreover, according to the present modification example, compared to Reference Example 3, it is possible to shorten the time required for the flushing processing.

In addition, in the present modification example, the nozzle N-1 among the odd-numbered nozzles N-1[1], N-1[3], and N-1[5] is an example of an "odd-numbered first nozzle", the nozzle N-1 among the even-numbered nozzles N-1[2], N-1[4], and N-1[6] is an example of an "even-numbered first nozzle", the piezoelectric element PZ-1 corresponding to the odd-numbered first nozzle is an example of an "odd-numbered first driving element", the piezoelectric element PZ-1 corresponding to the even-numbered first nozzle is an example of an "even-numbered first driving element", the supply driving signal Vin-1 supplied to the odd-numbered first driving element in the unit period TP(1) is an example of a "first driving signal", the supply driving signal Vin-1 supplied to the even-numbered first driving element in the unit period TP(1) is an example of a "second driving signal", the supply driving signal Vin-1 supplied to the odd-numbered first driving element in the unit period TP(2) is an example of a "third driving signal", and the supply driving signal Vin-1 supplied to the even-numbered first driving element in the unit period TP(2) is an example of a "fourth driving signal".

In addition, in the present modification example, the supply driving signal Vin-1 supplied to the odd-numbered first driving element in the unit period TP(1) includes three waveforms PAA, and the supply driving signal Vin-1 supplied to the even-numbered first driving element in the unit period TP(1) includes one waveform PAA, the supply driving signal Vin-1 supplied to the odd-numbered first driving element in the unit period TP(2) includes one waveform PAA, and the supply driving signal Vin-1 supplied to the even-numbered first driving element in the unit period TP(2) includes three waveforms PAA.

Therefore, according to the present modification example, compared to Reference Example 1, the density of the dots Dt of ink discharged from the nozzle N-1[1] and the nozzle N-2[1] in the space between the head unit 3 and the recording paper sheet PP is low, the amount of mist rolled up around the nozzle N can be reduced, and the deterioration in print quality caused by mist can be suppressed. Moreover, according to the present modification example, compared to Reference Example 3, it is possible to shorten the time required for the flushing processing.

In addition, in the present modification example, in the unit period TP(1), the control unit 2 supplies the supply driving signals Vin-1[1], Vin-1[3], and Vin-1[5] having the large amount ink ejection waveform PF1 to the odd-numbered piezoelectric elements PZ-1[1], PZ-1[3], and PZ-1[5] among the piezoelectric elements PZ-1[1] to PZ-1[6] corresponding to the nozzles N-1[1] to N-1[6] belonging to the nozzle array NL-1 to eject the liquid in the cavities CV-1[1], CV-1[3], and CV-1[5] from the nozzles N-1[1], N-1[3], and N-1[5]. In the unit period TP(1), the control unit 2 supplies the supply driving signals Vin-1[2], Vin-1[4], and Vin-1[6] having the small amount ink ejection waveform PF2 different from the large amount ink ejection waveform PF1 to the even-numbered piezoelectric elements PZ-1[2], PZ-1[4], and PZ-1[6] among the piezoelectric elements PZ-1[1] to PZ-1[6] corresponding to the nozzles N-1[1] to N-1[6] belonging to the nozzle array NL-1 to eject the liquid in the cavities CV-1[2], CV-1[4], and CV-1[6] from the nozzles N-1[2], N-1[4], and N-1[6]. In the unit period TP(1), the control unit 2 supplies the supply driving signals Vin-2[1], Vin-2[3], and Vin-2[5] having the small amount ink ejection waveform PF2 to the odd-numbered piezoelectric elements PZ-2[1], PZ-2[3], and PZ-2[5] among the piezoelectric elements PZ-2[1] to PZ-2[6] corresponding to the nozzles N-2[1] to N-2[6] belonging to the nozzle array NL-2 to eject the liquid in the cavities CV-2[1], CV-2[3], and CV-2[5] from the nozzles N-2[1], N-2[3], and N-2[5]. In the unit period TP(1), the control unit 2 supplies the supply driving signals Vin-2[2], Vin-2[4], and Vin-2[6] having the large amount ink ejection waveform PF1 to the even-numbered piezoelectric elements PZ-2[2], PZ-2[4], and PZ-2[6] among the piezoelectric elements PZ-2[1] to PZ-2[6] corresponding to the nozzles N-2[1] to N-2[6] belonging to the nozzle array NL-2 to eject the liquid in the cavities CV-2[2], CV-2[4], and CV-2[6] from the nozzles N-2[2], N-2[4], and N-2[6]. In the unit period TP(2), the control unit 2 supplies the supply driving signals Vin-1[1], Vin-1[3], and Vin-1[5] having the small amount ink ejection waveform PF2 to the odd-numbered piezoelectric elements PZ-1[1], PZ-1[3], and PZ-1[5] among the piezoelectric elements PZ-1[1] to PZ-1[6] corresponding to the nozzles N-1[1] to N-1[6] belonging to the nozzle array NL-1 to eject the liquid in the cavities CV-1[1], CV-1[3], and CV-1[5] from the nozzles N-1[1], N-1[3], and N-1[5]. In the unit period TP(2), the control unit 2 supplies the supply driving signals Vin-1[2], Vin-1[4], and Vin-1[6] having the large amount ink ejection waveform PF1 different from the small amount ink ejection waveform PF2 to the even-numbered piezoelectric elements PZ-1[2], PZ-1[4], and PZ-1[6] among the piezoelectric elements PZ-1[1] to PZ-1[6] corresponding to the nozzles N-1[1] to N-1[6] belonging to the nozzle array NL-1 to eject the liquid in the cavities CV-1[2], CV-1[4], and CV-1[6] from the nozzles N-1[2], N-1[4], and N-1[6]. In the unit period TP(2), the control unit 2 supplies the supply driving signals Vin-2[1], Vin-2[3], and Vin-2[5] having the large amount ink ejection waveform PF1 to the odd-numbered piezoelectric elements PZ-2[1], PZ-2[3], and PZ-2[5] among the piezoelectric elements PZ-2[1] to PZ-2[6] corresponding to the nozzles N-2[1] to N-2[6] belonging to the nozzle array NL-2 to eject the liquid in the cavities CV-2[1], CV-2[3], and CV-2[5] from the nozzles N-2[1], N-2[3], and N-2[5]. In the unit period TP(2), the control unit 2 supplies the supply driving signals Vin-2[2], Vin-2[4], and Vin-2[6] having the small amount ink ejection waveform PF2 to the even-numbered piezoelectric elements PZ-2[2], PZ-2[4], and PZ-2[6] among the piezoelectric elements PZ-2[1] to PZ-2[6] corresponding to the nozzles N-2[1] to N-2[6] belonging to the nozzle array NL-2 to eject the liquid in the cavities CV-2[2], CV-2[4], and CV-2[6] from the nozzles N-2[2], N-2[4], and N-2[6].

Therefore, according to the present modification example, compared to Reference example 1, it is possible to suppress deterioration in print quality caused by mist. Moreover, according to the present modification example, compared to Reference Example 3, it is possible to shorten the time required for the flushing processing.

In addition, in the present modification example, the supply driving signal Vin-1 supplied to the odd-numbered first driving element in the unit period TP(1) includes three waveforms PAA, and the supply driving signal Vin-1 supplied to the even-numbered first driving element in the unit period TP(1) includes one waveform PAA, the supply driving signal Vin-1 supplied to the odd-numbered first driving element in the unit period TP(2) includes one waveform PAA, and the supply driving signal Vin-1 supplied to the even-numbered first driving element in the unit period TP(2) includes three waveforms PAA.

Therefore, according to the present modification example, compared to Reference Example 1, the density of the dots Dt of ink discharged from the nozzle N-1[1] and the nozzle N-2[1] in the space between the head unit 3 and the recording paper sheet PP is low, the amount of mist rolled up around the nozzle N can be reduced, and the deterioration in print quality caused by mist can be suppressed. Moreover, according to the present modification example, compared to Reference Example 3, it is possible to shorten the time required for the flushing processing.

Modification Example 4

In the above-described embodiment and Modification Examples 1 to 3, an example in which the large amount ink ejection waveform PF1 includes three waveforms PAA, and the small amount ink ejection waveform PF2 includes one waveform PAA is described, but the present disclosure is not limited to such aspects. For example, the waveform included in the large amount ink ejection waveform PF1 and the waveform included in the small amount ink ejection waveform PF2 may be different.

In the present modification example illustrated in FIG. 19, when the individual designation signal Sd[m] indicates the value "5", the coupled state designation circuit 310 sets the coupled state designation signal Qa[m] to a high level in the control period TQ1, the control period TQ2, and the control period TQ3. In this case, the switch Wa[m] is turned on for the flushing unit period TPF. Therefore, the discharge section D[m] is driven by the supply driving signal Vin[m] having the waveform PA1, the waveform PA2, and the waveform PA3 in the flushing unit period TPF, and discharges the ink having the ink amount ξ4 corresponding to the large amount ink ejection.

Further, when the individual designation signal Sd[m] indicates the value "6", the coupled state designation circuit 310 sets the coupled state designation signal Qb[m] to a high level in the control period TQ1 and the control period TQ2. In this case, the switch Wb[m] is turned on in the control period TQ1 and the control period TQ2. Therefore, the discharge section D[m] is driven by the supply driving signal Vin[m] having the waveform PB1 and the waveform PB2 in the flushing unit period TPF, and discharges the ink having the ink amount ξ6 smaller than the ink amount ξ4.

That is, in the present modification example, the large amount ink ejection waveform PF1 is a waveform consisting of the waveform PA1, the waveform PA2, and the waveform PA3, the small amount ink ejection waveform PF2 is a waveform consisting of the waveform PB1 and the waveform PB2.

As described above, in the present modification example, the first driving signal includes three waveforms PAA, the second driving signal includes two waveforms PBB, the third driving signal includes two waveforms PBB, and the fourth driving signal includes three waveforms PAA. That is, in the present modification example, the waveform included in the first driving signal is different from the waveform included in the second driving signal, the waveform included in the first driving signal is different from the waveform included in the third driving signal, the waveform included in the second driving signal is different from the waveform included in the fourth driving signal, and the waveform included in the third driving signal is different from the waveform included in the fourth driving signal.

Therefore, according to the present modification example, compared to the aspect in which each of the first to fourth driving signals has three waveforms PAA similarly to Reference Example 1, the density of the dots Dt of ink discharged from the nozzles N in the space between the head unit 3 and the recording paper sheet PP is low, the amount of mist rolled up around the nozzle N can be reduced, and the deterioration in print quality caused by mist can be suppressed.

Further, in the present modification example, when the piezoelectric element PZ[m] is driven by the supply driving signal Vin[m] having the waveform PAA, the speed of the dots Dt discharged from the nozzle N[m] is higher than the speed of the dots Dt discharged from the nozzle N[m] when the piezoelectric element PZ[m] is driven by the supply driving signal Vin[m] having the waveform PBB.

Therefore, according to the present modification example, compared to the aspect in which each of the first to fourth driving signals has three waveforms PAA similarly to Reference Example 1, the density of the dots Dt of ink discharged from the nozzles N in the space between the head unit 3 and the recording paper sheet PP is low, the amount of mist rolled up around the nozzle N can be reduced, and the deterioration in print quality caused by mist can be suppressed.

In addition, in the present modification example, the waveform PAA is an example of a "first driving pulse", and the waveform PBB is an example of a "second driving pulse".

Further, in the present modification example, when the piezoelectric element PZ[m] is driven by the supply driving signal Vin[m] having the waveform PAA, the amount of dots Dt discharged from the nozzle N[m] is greater than the amount of the dots Dt discharged from the nozzle N[m] when the piezoelectric element PZ[m] is driven by the supply driving signal Vin[m] having the waveform PBB.

Therefore, according to the present modification example, compared to the aspect in which each of the first to fourth driving signals has three waveforms PAA similarly to Reference Example 1, the density of the dots Dt of ink discharged from the nozzles N in the space between the head unit 3 and the recording paper sheet PP is low, the amount of mist rolled up around the nozzle N can be reduced, and the deterioration in print quality caused by mist can be suppressed.

Modification Example 5

In the above-described embodiment and Modification Examples 1 to 5, the waveform PA1, the waveform PA2, and the waveform PA3 included in the driving signal Com-A have substantially the same shape, and the waveform PB1 and the waveform PB2 included in the driving signal Com-B have substantially the same shape, but the present disclosure is not limited to such aspects. For example, the waveform PA1 and the waveform PA2 may be waveforms having different shapes, the waveform PA1 and the waveform PA3 may be waveforms having different shapes, and the waveform PA2 and the waveform PA3 may be waveforms having different shapes. In addition, the waveform PB1 and the waveform PB2 may have different shapes.

Modification Example 6

In the above-described embodiment and Modification Examples 1 to 5, an example in which the driving signal Com-A includes three discharge waveforms, that is, the waveform PA1, the waveform PA2, and the waveform PA3, as discharge waveforms for discharging ink from the nozzle N, and the driving signal Com-B includes two discharge waveforms, that is, the waveform PB1 and the waveform PB2, is described, but the present disclosure is not limited to such aspects. For example, the driving signal Com-A may include at least one discharge waveform, and the driving signal Com-B may include at least one discharge waveform.

Modification Example 7

In the above-described embodiment and Modification Examples 1 to 6, an example in which the driving signal Com includes two signals, that is, the driving signal Com-A and the driving signal Com-B, is described, but the present disclosure is not limited to such aspects.

For example, the driving signal Com may include only the driving signal Com-A and may not include the driving signal Com-B. In this case, the driving signal Com-A may include at least two discharge waveforms.

Further, for example, the driving signal Com may include only the driving signal Com-B and may not include the driving signal Com-A. In this case, the driving signal Com-B may include at least two discharge waveforms.

Further, for example, the driving signal Com may include, in addition to the driving signal Com-A and the driving signal Com-B, a driving signal having a waveform different from that of the driving signal Com-A and the driving signal Com-B.

Modification Example 8

In the above-described embodiment and Modification Examples 1 to 7, an example in which the head unit 3 has two nozzle arrays NL, that is, the nozzle array NL-1 and the nozzle array NL-2, is described, but the present disclosure is not limited to such aspects. The head unit 3 may have only one nozzle array NL-1 described above, or may have three or more nozzle arrays NL.

When the head unit 3 has three or more nozzle arrays NL, the nozzle array NL-1 and the nozzle array NL-2 described above are adjacent nozzle arrays NL. That is, when the head unit 3 has three or more nozzle arrays NL, there is no other nozzle array NL between the nozzle array NL-1 and the nozzle array NL-2. When the head unit 3 has three or more nozzle arrays NL, the piezoelectric element PZ corresponding to the nozzle array NL arranged on the +Y-axis side with respect to the nozzle array NL-2 may be driven similar to the piezoelectric element PZ-1 corresponding to the nozzle array NL-1, and may be driven in a manner different from the piezoelectric element PZ-1 corresponding to the nozzle array NL-1 and the piezoelectric element PZ-2 corresponding to the nozzle array NL-2. In short, even when the head unit 3 has three or more nozzle arrays NL, the piezoelectric elements PZ corresponding to the nozzle arrays NL positioned on both sides of each inter-nozzle pressure reduction space SP can be driven according to the above-described embodiment and modification examples. By adopting such a configuration, it is possible to suppress the self jet flow and suppress adhesion of mist to the head unit 3. Modification Example 9

In the above-described embodiment and modification examples 1 to 8, the nozzle array NL1 and the nozzle array NL-2 included in the head unit 3 is described. However, when the plurality of head units 3 are arranged in the Y-axis direction, in order to provide the inter-nozzle pressure reduction space SP between the head units 3 and suppress adhesion of mist to the head unit 3 due to the self jet flow, the piezoelectric elements PZ corresponding to the nozzle arrays NL positioned on both sides of the inter-nozzle pressure reduction space SP between the head units 3 can be driven according to the above-described embodiment and modification examples. By adopting such a configuration, it is possible to suppress the self jet flow and suppress adhesion of mist to the head unit 3.

Modification Example 10

Although the ink jet printer 1 has four head units 3 in the above-described embodiment and Modification Examples 1 to 9, the present disclosure is not limited to such aspects. The ink jet printer 1 may include one or more and three or less head units 3, or the ink jet printer 1 may include five or more head units 3.

Modification Example 11

In the above-described embodiment and Modification Examples 1 to 10, an example in which the ink jet printer 1 is a serial printer is described, the present disclosure is not limited to such aspects. The ink jet printer 1 may be a so-called line printer in which a plurality of nozzles N are provided in the head unit 3 to extend wider than the width of the recording paper sheet PP.

What is claimed is:

1. A maintenance method of a head unit including a first nozzle array having a plurality of first nozzles arranged in parallel along a first axis and discharging a liquid, a second nozzle array having a plurality of second nozzles arranged in parallel along a second axis parallel to the first axis and discharging a liquid, a plurality of first pressure chambers provided corresponding to the plurality of first nozzles and filled with the liquid, a plurality of second pressure chambers provided corresponding to the plurality of second nozzles and filled with the liquid, a plurality of first driving elements provided corresponding to the plurality of first pressure chambers for varying pressures in the corresponding first pressure chambers, a plurality of second driving elements provided corresponding to the plurality of second pressure chambers for varying pressures in the corresponding second pressure chambers, and a supply section that is configured to supply driving signals to the plurality of first driving elements and the plurality of second driving elements, the method comprising:

in a first period, supplying a first driving signal having a first waveform to one first driving element among the plurality of first driving elements to eject the liquid in one first pressure chamber corresponding to the one first driving element among the plurality of first pressure chambers from one first nozzle corresponding to the one first pressure chamber among the plurality of first nozzles; and supplying a second driving signal having a second waveform different from the first waveform to one second driving element among the plurality of second driving elements to eject the liquid in one second pressure chamber corresponding to the one second driving element among the plurality of second pressure chambers from one second nozzle corresponding to the one second pressure chamber among the plurality of second nozzles; and in a second period different from the first period, supplying a third driving signal having a third waveform different from the first waveform to the one first driving element to eject the liquid in the one first pressure chamber from the one first nozzle; and supplying a fourth driving signal having a fourth waveform different from the second waveform and the third waveform to the one second driving element to eject the liquid in the one second pressure chamber from the one second nozzle.

2. The maintenance method according to claim 1, wherein in the first period, the first driving signal is supplied to the plurality of first driving elements to eject the liquid in the plurality of first pressure chambers from the plurality of first nozzles, and the second driving signal is supplied to the plurality of second driving elements to eject the liquid in the plurality of second pressure chambers from the plurality of second nozzles, and in the second period, the third driving signal is supplied to the plurality of first driving elements to eject the liquid in the plurality of first pressure chambers from the plurality of first nozzles, and the fourth driving signal is supplied to the plurality of second driving elements to eject the liquid in the plurality of second pressure chambers from the plurality of second nozzles.

3. The maintenance method according to claim 1, wherein in the first period, the second driving signal is supplied to another first driving element corresponding to another first nozzle adjacent to the one first nozzle included in the plurality of first nozzles among the plurality of first driving elements to eject the liquid in another first pressure chamber corresponding to the other first driving element among the plurality of first pressure chambers from the other first nozzle, and in the second period, the fourth driving signal is supplied to the other first driving element to eject the liquid in the other first pressure chamber from the other first nozzle.

4. The maintenance method according to claim 3, wherein the one first driving element is one of odd-numbered first driving elements corresponding to odd-numbered first nozzles among the plurality of first nozzles, among the plurality of first driving elements, the other first driving element is one of even-numbered first driving elements corresponding to even-numbered first nozzles among the plurality of first nozzles, among the plurality of first driving elements, in the first period, the first driving signal is supplied to the odd-numbered first driving elements to eject the liquid in odd-numbered first pressure chambers corresponding to the odd-numbered first driving elements among the plurality of first pressure chambers from the odd-numbered first nozzles, and the second driving signal is supplied to the even-numbered first driving elements to eject the liquid in even-numbered first pressure chambers corresponding to the even-numbered first driving elements among the plurality of first pressure chambers from the even-numbered first nozzles, and in the second period, the third driving signal is supplied to the odd-numbered first driving elements to eject the liquid in the odd-numbered first pressure chambers from the odd-numbered first nozzles, and the fourth driving signal is supplied to the even-numbered first driving elements to eject the liquid in the even-numbered first pressure chambers from the even-numbered first nozzles.

5. The maintenance method according to claim 4, wherein the one second driving element is one of odd-numbered second driving elements corresponding to odd-numbered second nozzles among the plurality of second nozzles, among the plurality of second driving elements, in the first period, the second driving signal is supplied to the odd-numbered second driving elements among the plurality of second driving elements to eject the liquid in odd-numbered second pressure chambers corresponding to the odd-numbered second driving elements among the plurality of second pressure chambers from the odd-numbered second nozzles, and the first driving signal is supplied to even-numbered second driving elements corresponding to even-numbered second nozzles among the plurality of second nozzles, among the plurality of second driving elements, to eject the liquid in even-numbered second pressure chambers corresponding to the even-numbered second driving elements among the plurality of second pressure chambers from the even-numbered second nozzles, and in the second period, the fourth driving signal is supplied to the odd-numbered second driving elements to eject the liquid in the odd-numbered second pressure chambers from the odd-numbered second nozzles, and the third driving signal is supplied to the even-numbered second driving elements to eject the liquid in the even-numbered second pressure chambers from the even-numbered second nozzles.

6. The maintenance method according to claim 1, wherein the first driving signal has a first number of first driving pulses for driving the one first driving element to discharge the liquid from the one first nozzle, the second driving signal has a second number of second driving pulses, which is different from the first number, for driving the one second driving element to discharge the liquid from the one second nozzle, the third driving signal has a third number of third driving pulses, which is different from the first number, for driving the one first driving element to discharge the liquid from the one first nozzle, and the fourth driving signal has a fourth number of fourth driving pulses, which is different from the second number and the third number, for driving the one second driving element to discharge the liquid from the one second nozzle.

7. The maintenance method according to claim 6, wherein a waveform of the first driving pulse, a waveform of the second driving pulse, a waveform of the third driving pulse, and a waveform of the fourth driving pulse have the same shape, the first number and the fourth number are the same number, and the second number and the third number are the same number.

8. The maintenance method according to claim 1, wherein the first driving signal has a first driving pulse for driving the one first driving element to discharge the liquid from the one first nozzle, the second driving signal has a second driving pulse for driving the one second driving element to discharge the liquid from the one second nozzle, the third driving signal has a third driving pulse for driving the one first driving element to discharge the liquid from the one first nozzle, the fourth driving signal has a fourth driving pulse for driving the one second driving element to discharge the liquid from the one second nozzle, a waveform of the first driving pulse is different from a waveform of the second driving pulse, the waveform of the first driving pulse is different from a waveform of the third driving pulse, the waveform of the second driving pulse is different from a waveform of the fourth driving pulse, and the waveform of the third driving pulse is different from the waveform of the fourth driving pulse.

9. The maintenance method according to claim 8, wherein the waveform of the first driving pulse and the waveform of the fourth driving pulse have the same shape, and the waveform of the second driving pulse and the waveform of the third driving pulse have the same shape.

10. The maintenance method according to claim 8, wherein a speed of the liquid discharged from the one first nozzle when the one first driving element is driven by the first driving pulse is higher than a speed of the liquid discharged from the one second nozzle when the one second driving element is driven by the second driving pulse.

11. The maintenance method according to claim 8, wherein an amount of the liquid discharged from the one first nozzle when the one first driving element is driven by the first driving pulse is greater than an amount of the liquid discharged from the one second nozzle when the one second driving element is driven by the second driving pulse.

12. The maintenance method according to claim 1, wherein the first waveform and the fourth waveform have the same shape, and the second waveform and the third waveform have the same shape.

13. The maintenance method according to claim 1, wherein the first nozzle array and the second nozzle array are adjacent to each other.

* * * * *